United States Patent
Takahashi et al.

(10) Patent No.: US 10,563,760 B2
(45) Date of Patent: Feb. 18, 2020

(54) ROTARY ACTUATOR, ROTATION DRIVING DEVICE, AND SHIFT-BY-WIRE SYSTEM USING SAME

(71) Applicant: DENSO CORPORATION, Kariya, Aichi-pref. (JP)

(72) Inventors: Yuuya Takahashi, Kariya (JP); Kiyoshi Kimura, Kariya (JP); Kenichi Oishi, Kariya (JP); Mikine Kume, Kariya (JP); Toru Tabuchi, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/375,019

(22) Filed: Apr. 4, 2019

(65) Prior Publication Data
US 2019/0229588 A1  Jul. 25, 2019

Related U.S. Application Data

(63) Continuation of application No. PCT/JP2017/037913, filed on Oct. 20, 2017.

(30) Foreign Application Priority Data

Oct. 25, 2016 (JP) ................................ 2016-208640
May 17, 2017 (JP) .................................. 2017-98270

(51) Int. Cl.
| F16H 61/32 | (2006.01) |
| F16H 57/02 | (2012.01) |
| H02K 7/116 | (2006.01) |
| F16H 1/32  | (2006.01) |
| G01D 5/245 | (2006.01) |
| F16H 19/00 | (2006.01) |

(52) U.S. Cl.
CPC ............... *F16H 61/32* (2013.01); *F16H 1/32* (2013.01); *G01D 5/245* (2013.01); *F16H 19/001* (2013.01);
(Continued)

(58) Field of Classification Search
CPC .......... F16H 61/32; F16H 1/32; F16H 19/001; F16H 2061/326; F16H 2057/02034;
(Continued)

(56) References Cited

U.S. PATENT DOCUMENTS 6,877,390 B2* 4/2005 Tsuzuki ................. F16H 59/08
                                                    74/335
7,146,871 B2* 12/2006 Ozaki ..................... F16H 61/32
                                                    74/335
(Continued)

FOREIGN PATENT DOCUMENTS

JP 2001-271925 10/2001
JP 2002-272057 9/2002
(Continued)

*Primary Examiner* — Burton S Mullins
(74) *Attorney, Agent, or Firm* — Nixon & Vanderhye P.C.

(57) ABSTRACT

An output shaft includes a shaft hole with which a shaft is fittable, rotates by torque output from a motor, and outputs torque to the shaft. A magnet holder includes a holder hole with which the shaft is fittable and is rotatable together with the shaft. A magnet is disposed on the magnet holder. An angle sensor is capable of detecting magnetic flux from the magnet and outputs a signal corresponding to a rotation angle of the magnet holder. A play amount between the shaft and the shaft hole is set to a first predetermined value or larger. A play amount between the shaft and the holder hole is set to a second predetermined value or smaller.

27 Claims, 16 Drawing Sheets

(52) U.S. Cl.
CPC .. *F16H 2001/325* (2013.01); *F16H 2061/326* (2013.01); *H02K 7/116* (2013.01)

(58) Field of Classification Search
CPC ....... F16H 1/326; F16H 57/02; H02K 11/215; H02K 7/116; G01D 5/12; G01D 5/56; G01D 5/245
USPC .............. 324/207.11, 207.13, 207.2, 207.25; 310/688
See application file for complete search history.

(56) References Cited

U.S. PATENT DOCUMENTS

| | | | |
|---|---|---|---|
| 7,658,123 B2 * | 2/2010 | Hori | F16H 61/32 74/335 |
| 8,146,454 B2 * | 4/2012 | Ito | F16D 1/06 74/473.1 |
| 8,707,817 B2 * | 4/2014 | Itazu | F16H 59/08 74/473.12 |
| 2007/0144287 A1 * | 6/2007 | Kimura | F16H 61/32 74/335 |
| 2010/0175487 A1 | 7/2010 | Sato | |
| 2013/0313949 A1 * | 11/2013 | Fujii | H02K 7/003 310/75 R |
| 2015/0285373 A1 | 10/2015 | Nagahori et al. | |
| 2016/0102761 A1 | 4/2016 | Kuwahara et al. | |

FOREIGN PATENT DOCUMENTS

| | | |
|---|---|---|
| JP | 2009-162268 | 7/2009 |
| JP | 2010-203543 | 9/2010 |
| JP | 5648564 | 1/2015 |

* cited by examiner

ROTARY ACTUATOR, ROTATION DRIVING DEVICE, AND SHIFT-BY-WIRE SYSTEM USING SAME

CROSS REFERENCE TO RELATED APPLICATION

The present application is a continuation application of International Patent Application No. PCT/JP2017/037913 filed on Oct. 20, 2017, which designated the U.S. and claims the benefit of priority from Japanese Patent Application No. 2016-208640 filed on Oct. 25, 2016 and Japanese Patent Application No. 2017-98270 filed on May 17, 2017. The entire disclosures of all of the above applications are incorporated herein by reference.

TECHNICAL FIELD

The present disclosure relates to a rotary actuator, a rotation driving device, and a shift-by-wire system using same.

BACKGROUND ART

There has been conventionally known a shift-by-wire system which controls driving of a rotary actuator according to a shift range selected by a driver and switches a shift range of an automatic transmission through a shift range switching device.

SUMMARY

According to an aspect of the present disclosure, a rotary actuator capable of rotating a shaft of a driving target includes a housing, a motor, an output shaft, a magnet holder, a magnet, and an angle sensor. The motor is disposed inside the housing. The output shaft includes a shaft hole with which the shaft is fittable, rotates by torque output from the motor, and outputs torque to the shaft. The magnet holder includes a holder hole with which the shaft is fittable and is rotatable together with the shaft. The magnet is disposed on the magnet holder. The angle sensor is capable of detecting magnetic flux from the magnet and outputting a signal corresponding to a rotation angle of the magnet holder, such that the rotation angle of the shaft can be detected. A play amount between the shaft and the shaft hole is set to a first predetermine value or larger. A play amount between the shaft and the holder hole is set to a second predetermined value or smaller.

BRIEF DESCRIPTION OF DRAWINGS

The above and other objects, features, and advantages of the present disclosure will become more apparent from the following detailed description with reference to the accompanying drawings. In the drawings.

DESCRIPTION OF EMBODIMENTS

Figure 1:
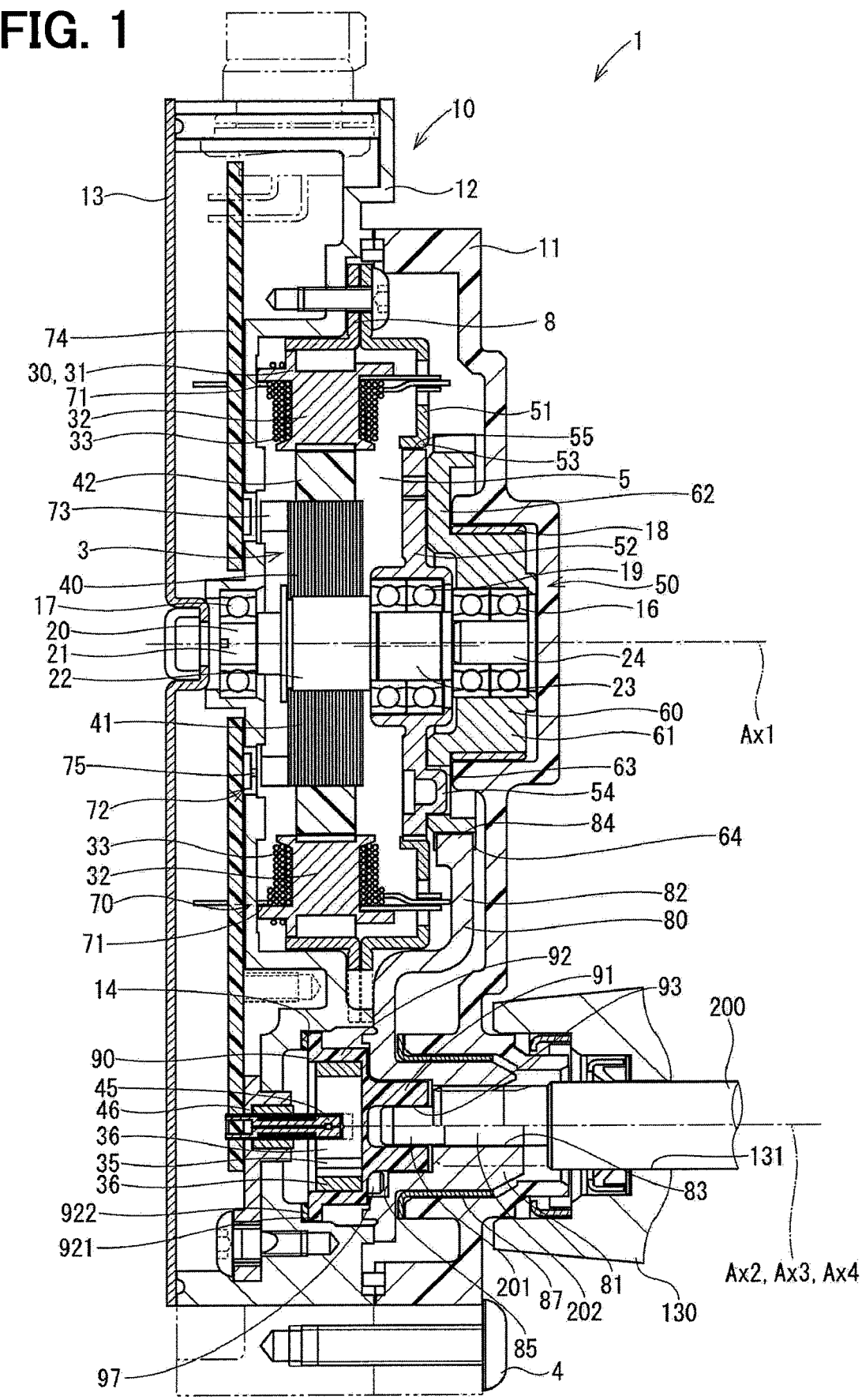
FIG. 1 is a sectional view of a rotary actuator according to a first embodiment.

To begin with, examples of relevant techniques will be described.

In a shift-by-wire system, a rotary actuator includes an output shaft which outputs torque to a manual shaft of a shift range switching device. The shift-by-wire system includes a magnet holder which is formed separately from the output shaft 80 and rotates by the rotation of the output shaft on an axis different from the axis of the output shaft. Further, the rotation angle of the magnet holder is detected by detecting magnetic flux from a magnet which is disposed on the magnet holder using an angle sensor to indirectly detect the rotation angle of the manual shaft through the output shaft.

In order to ensure the assemblability between the output shaft and the manual shaft, a predetermined amount of play is set between the output shaft and the manual shaft. Further, in order to achieve smooth relative rotation between the magnet holder and the output shaft, a predetermined amount of play is set also between the magnet holder and the output shaft. Thus, a relatively large play is set between the magnet holder and the manual shaft. Thus, the accuracy of detecting the rotation angle of the manual shaft by the angle sensor may be reduced.

The present disclosure provides a rotary actuator having high assemblability with a shaft as a driving target and high accuracy of detecting the rotation angle of the shaft.

According to an aspect of the present disclosure, a rotary actuator capable of rotating a shaft of a driving target includes a housing, a motor, an output shaft, a magnet holder, a magnet, and an angle sensor. The motor is disposed inside the housing. The output shaft includes a shaft hole with which the shaft is fittable, rotates by torque output from the motor, and outputs torque to the shaft. The magnet holder includes a holder hole with which the shaft is fittable and is rotatable together with the shaft. The magnet is disposed on the magnet holder. The angle sensor is capable of detecting magnetic flux from the magnet and outputting a signal corresponding to a rotation angle of the magnet holder, such that the rotation angle of the shaft can be detected.

A play amount between the shaft and the shaft hole is set to a first predetermine value or larger. Thus, it is possible to easily fit the shaft with the shaft hole and improve the assemblability between the shaft and the output shaft.

A play amount between the shaft and the holder hole is set to a second predetermined value or smaller. Accordingly, the relative rotation between the shaft and the magnet holder is restricted, and the magnet holder is rotatable integrally with the shaft. Thus, it is possible to increase the accuracy of detecting the rotation angle of the shaft by the angle sensor.

In another example, an output unit of a rotation driving device is connected to a shift range switching device of an automatic transmission, and the shift range of the automatic transmission can be switched by torque output from the output unit. The rotation driving device is provided with a rotary member which is made of resin and includes external teeth which mesh with external teeth of the output unit. A magnet is disposed on the rotary member. The rotation position of the rotary member is detected by detecting magnetic flux from the magnet to indirectly detect a rotation position of the output unit and a shift position of the shift range switching device. Thus, the accuracy of detecting the rotation position of the output unit may be reduced by a play between the output unit and the rotary member.

In the shift-by-wire system, the output unit is made of a magnetic material such as iron in view of strength. If a magnet is disposed on the output unit in order to directly detect the rotation position of the output unit, magnetic flux from the magnet may flow to the output unit, which may reduce the density of magnetic flux to be detected. In this case, the accuracy of detecting the rotation position of the output unit may be reduced.

In another example, a rotary electric machine is disposed on a front housing side of a housing which houses the rotary electric machine therein, and a reduction gear is disposed on a rear housing side. Torque of the rotary electric machine is decelerated by the reduction gear as a gear mechanism and output to a manual shaft of a shift range switching device through an output unit. It is considered that, in the rotation driving device, the rear housing faces or abuts on an outer wall of the shift range switching device. The reduction gear projects toward the shift range switching device from the center of the rotary electric machine. Thus, a dead space having a substantially annular shape may be formed between an out wall of the rear housing around the reduction rear and the outer wall of the shift range switching device. Thus, the mountability of the rotation driving device may be deteriorated.

In the rotation driving device, when a magnetic flux density detector for detecting the rotation position of the output unit is disposed on the front housing side, the magnetic flux density detector is disposed at a position close to the rotary electric machine. Thus, the accuracy of detecting the rotation position of the output unit may be reduced by leakage flux from the rotary electric machine. On the other hand, when the magnetic flux density detector is disposed on the rear housing side which is far from the rotary electric machine, the dead space described above further increases, which may further deteriorate the mountability of the rotation driving device.

The present disclosure provides a rotation driving device having high accuracy of detecting a rotation position of an output unit and high mountability and a shift-by-wire system using the rotation driving device.

According to an aspect of the present disclosure, a rotation driving device includes a housing, a rotary electric machine, an output gear, an output unit, a yoke, a first magnetic flux generator, a second magnetic generator, a magnetic flux density detector, and a first hole. The rotary electric machine is disposed inside the housing. The output gear is made of a magnetic material and rotates by torque output from the rotary electric machine. The output unit is disposed integrally with the output gear in such a manner that an axis is aligned with a rotation center of the output gear and rotates together with the output gear.

The yoke is disposed on the output gear, the yoke including a first yoke and a second yoke that forms an arc-shaped space along an arc centered at the rotation center with the first yoke. The first magnetic flux generator is disposed between one end of the first yoke and one end of the second yoke. The second magnetic generator is disposed between the other end of the first yoke and the other end of the second yoke. The magnetic flux density detector is disposed on the housing movably relative to the yoke in the arc-shaped space and outputs a signal corresponding to a density of magnetic flux passing through the magnetic flux density detector. The first hole is formed between the rotation center and the yoke and penetrates the output gear in a plate-thickness direction.

In this aspect, magnetic flux generated from the first magnetic flux generator and the second magnetic flux generator flows through the first yoke and the second yoke, and flies in the arc-shaped space between the first yoke and the second yoke as leakage flux. The magnetic flux density detector outputs a signal corresponding to the density of leakage flux flying in the arc-shaped space. Accordingly, it is possible to detect the position of the yoke relative to the magnetic flux density detector and detect the rotation position of the output unit.

The magnetic flux generated from the first magnetic flux generator and the second magnetic flux generator also flows through the output gear which is made of a magnetic material. In this aspect, the first hole is formed between the rotation center of the output gear and the yoke, that is, at a specific part of the output gear. Thus, it is possible to narrow the path of magnetic flux flowing through the output gear. Accordingly, it is possible to reduce magnetic flux flowing through the output gear. Thus, it is possible to increase the density of magnetic flux flying in the arc-shaped space. Thus, it is possible to increase the accuracy of detecting the rotation position of the output unit.

According to another aspect of the present disclosure, a rotation driving device is attached to an attachment target and capable of rotating a driving target. The rotation driving device includes a front housing, a rear housing, a rotary electric machine, a gear mechanism, an output unit, and a magnetic flux density detector.

The rear housing forms a space with the front housing and is disposed in such a manner that a face opposite to the front housing is capable of facing or abutting on the attachment target. The rotary electric machine is disposed on the rear housing side in the space. The gear mechanism is disposed on the front housing side with respect to the rotary electric machine in the space and capable of transmitting torque of the rotary electric machine. The output unit is disposed outside the rotary electric machine in a radial direction, includes a connector connectable to the driving target on the attachment target side, and outputs torque transmitted by the gear mechanism to the driving target. The magnetic flux density detector is disposed on the front housing side rotatably relative to the output unit and outputs a signal corresponding to a density of magnetic flux passing through the magnetic flux density detector.

In this aspect, the gear mechanism is disposed on the front housing side with respect to the rotary electric machine. Thus, the rear housing which is disposed on the side opposite to the gear mechanism with respect to the rotary electric machine can be formed in a flat shape. Accordingly, when the rotation driving device is attached to the attachment target, a dead space which may be formed between the rear housing and the attachment target can be reduced. Thus, it is possible to improve the mountability of the rotation driving device.

In this aspect, the magnetic flux density detector is disposed on the front housing side. That is, the magnetic flux density detector can be disposed on the side opposite to the rotary electric machine with respect to the gear mechanism. Thus, it is possible to increase the distance between the magnetic flux density detector and the rotary electric machine. Accordingly, it is possible to prevent leakage flux from the rotary electric machine from affecting the magnetic flux density detector. Thus, it is possible to improve the accuracy of detecting the rotation position of the output unit by the magnetic flux density detector.

In this aspect, the magnetic flux density detector is disposed on the front housing side. Thus, it is possible to more reliably prevent an increase of the dead space which may be formed between the rear housing and the attachment target compared to the case where the magnetic flux density detector is disposed on the rear housing side.

Hereinbelow, rotary actuators according to a plurality of embodiments will be described with reference to FIGS. 1 to 10. Substantially identical elements are designated by the same reference signs throughout the embodiments illustrated in FIGS. 1 to 10, and description thereof is omitted. Further, substantially identical elements in the embodiments achieve the same or similar effects.

First Embodiment

A rotary actuator 1 illustrated in FIG. 1 is, for example, used as a driving unit of a shift-by-wire system which switches a shift of an automatic transmission of a vehicle.

Figure 2:
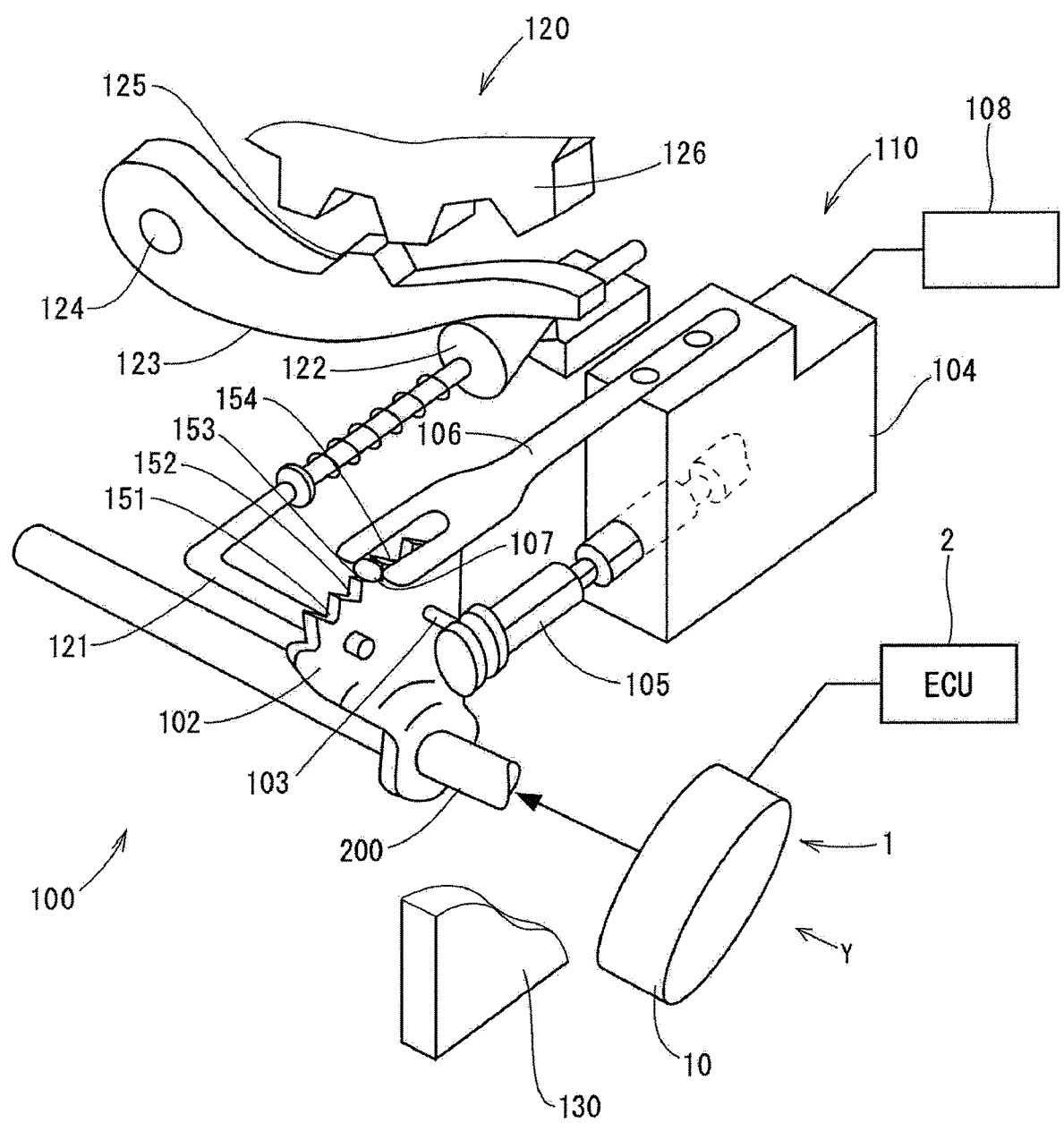
FIG. 2 is a schematic view of a shift-by-wire system in which the rotary actuator according to the first embodiment is used.

First, the shift-by-wire system will be described. As illustrated in FIG. 2, a shift-by-wire system 100 is provided with the rotary actuator 1, an electronic control unit (hereinbelow, referred to as the "ECU") 2, a shift range switching device 110, and a parking switching device 120. The rotary actuator 1 rotates a manual shaft 200 of the shift range switching device 110 as a driving target. Accordingly, the shift range of an automatic transmission 108 is switched. The rotation of the rotary actuator 1 is controlled by the ECU 2. The rotary actuator 1 is, for example, attached to a wall 130 of the shift range switching device 110 as an attachment target. The rotary actuator 1 drives a park rod 121 of the parking switching device 120 by rotating the manual shaft 200 of the shift range switching device 110. The manual shaft 200 corresponds to the "shaft".

The shift range switching device 110 includes the manual shaft 200, a detent plate 102, a hydraulic valve body 104, and the wall 130. The wall 130 houses the manual shaft 200, the detent plate 102, and the hydraulic valve body 104 therein. One end of the manual shaft 200 projects from the wall 130 through a hole 131 (refer to FIG. 1) which is formed on the wall 130.

The one end of the manual shaft 200 is fitted with an output shaft 80 of the rotary actuator 1 (described below). The detent plate 102 is formed in a sector shape extending outward in the radial direction from the manual shaft 200, and rotates integrally with the manual shaft 200. The detent plate 102 is provided with a pin 103 which projects parallel to the manual shaft 200.

The pin 103 is locked to an end of a manual spool valve 105 which is disposed on the hydraulic valve body 104. Thus, the manual spool valve 105 reciprocates in an axial direction by the detent plate 102 which rotates integrally with the manual shaft 200. The manual spool valve 105 reciprocates in the axial direction to switch a hydraulic supply passage to a hydraulic clutch in the automatic transmission 108. As a result, an engagement state of the hydraulic clutch is switched, which changes the shift range of the automatic transmission 108.

The detent plate 102 includes a recess 151, a recess 152, a recess 153, and a recess 154 on an end in the radial direction. The recesses 151 to 154, for example, correspond to a P range, an R range, an N range, and a D range, each of which is the shift range of the automatic transmission 108, respectively. A stopper 107 which is supported on a tip of a leaf spring 106 is fitted into any of the recesses 151 to 154 of the detent plate 102. Accordingly, a position of the manual spool valve 105 in an axial direction is determined. At this time, a rotation position of the manual shaft 200 is held at a predetermined position. The detent plate 102, the leaf spring 106, and the stopper 107 constitute a "holding mechanism" which is capable of positioning the manual shaft 200 by holding the rotation position of the manual shaft 200 at the predetermined position.

When torque is applied to the detent plate 102 from the rotary actuator 1 through the manual shaft 200, the stopper 107 moves to another adjacent recess (any of the recesses 151 to 154). Accordingly, the position of the manual spool valve 105 in the axial direction is changed.

For example, when the manual shaft 200 is rotated in a clockwise direction in a view from arrow Y of FIG. 2, the pin 103 pushes the manual spool valve 105 into the hydraulic valve body 104 through the detent plate 102, which switches an oil passage inside the hydraulic valve body 104 to D, N, R, and P in this order. Accordingly, the shift range of the automatic transmission 108 is switched to D, N, R, and P in this order.

On the other hand, when the manual shaft 200 is rotated in a counterclockwise direction, the pin 103 pulls the manual spool valve 105 out of the hydraulic valve body 104, which switches the oil passage inside the hydraulic valve body 104 to P, R, N, and D in this order. Accordingly, the shift range of the automatic transmission 108 is switched to P, R, N, and D in this order.

In this manner, a rotation angle, that is, a predetermined position in a rotation direction of the manual shaft 200 which is driven to rotate by the rotary actuator 1 corresponds to each shift range of the automatic transmission 108.

The parking switching device 120 includes the park rod 121, a park pole 123, and a parking gear 126. The park rod 121 is formed in a substantially L shape. The detent plate 102 is connected to one end of the park rod 121. A conical part 122 is disposed on the other end of the park rod 121. The park rod 121 converts a rotary motion of the detent plate 102 into a linear motion, which reciprocates the conical part 122 in the axial direction. The park pole 123 abuts on the side face of the conical part 122. Thus, when the park rod 121 reciprocates, the park pole 123 rotates about a shaft 124.

The park pole 123 is provided with a projection 125 in the rotation direction thereof. When the projection 125 meshes with teeth of the parking gear 126, the rotation of the parking gear 126 is restricted. Accordingly, a driving wheel is locked through a drive shaft or a differential gear (not illustrated). On the other hand, when the projection 125 of the park pole 123 is detached from the teeth of the parking gear 126, the parking gear 126 becomes rotatable, and the lock of the driving wheel is released.

Next, the rotary actuator 1 will be described.

As illustrated in FIG. 1, the rotary actuator 1 is provided with a housing 10, an input shaft 20, a motor 3, a reduction gear 50 as a gear mechanism, an output gear 60, an output shaft 80, a magnet holder 90, a washer 922, a spring 94, a magnet 35, and an angle sensor 45.

The housing 10 includes a front housing 11, a rear housing 12, and a cover 13. The front housing 11 is, for example, made of resin. The rear housing 12 is, for example, made of metal such as aluminum. The cover 13 is, for example, made of metal and formed in a plate-like shape.

Each of the front housing 11 and the rear housing 12 is formed in a bottomed tubular shape. The front housing 11 and the rear housing 12 are fixed with a bolt 4 with openings of the front housing 11 and the rear housing 12 joined together. Accordingly, a space 5 is formed between the front housing 11 and the rear housing 12. The cover 13 covers the rear housing 12 on the side opposite to the front housing 11.

In the present embodiment, the rotary actuator 1 is attached to the wall 130 in such a manner that a face of the front housing 11 on the side opposite to the rear housing 12 faces the wall 130 of the shift range switching device 110.

The input shaft 20 is, for example, made of metal. The input shaft 20 includes one end part 21, a large-diameter part 22, an eccentric part 23, and the other end part 24. The one end part 21, the outer-diameter part 22, the eccentric part 23, and the other end part 24 are integrally formed and arranged side by side in the direction of an axis Ax1 in this order.

The one end part 21 is formed in a columnar shape. The large-diameter part 22 is formed in a columnar shape having a larger outer diameter than that of the one end part 21 and coaxial (the axis Ax1) with the one end part 21. The eccentric part 23 is formed in a columnar shape having a smaller outer diameter than that of the large-diameter part 22 and eccentric with respect to the axis Ax1 which is a rotation center of the input shaft 20. That is, the eccentric part 23 is eccentric with respect to the one end part 21 and the large-diameter part 22. The other end part 24 is formed in a columnar shape having a smaller outer diameter than that of the eccentric part 23 and coaxial (the axis Ax1) with the one end part 21 and the large-diameter part 22.

The other end part 24 of the input shaft 20 is rotatably supported by a front bearing 16, and the one end part 21 of the input shaft 20 is rotatably supported by a rear bearing 17. In the present embodiment, each of the front bearing 16 and the rear bearing 17 is, for example, a ball bearing.

The front bearing 16 is disposed inside the output gear 60 (described below). The output gear 60 is rotatably supported by a metal bearing 18 which is disposed inside the front housing 11. The metal bearing 18 is made of metal and has a tubular shape. That is, the other end part 24 of the input shaft 20 is rotatably supported through the metal bearing 18, the output gear 60, and the front bearing 16 which are disposed in the front housing 11. On the other hand, the one end part 21 of the input shaft 20 is rotatably supported through the rear bearing 17 which is disposed on the bottom of the rear housing 12. In this manner, the input shaft 20 is rotatably supported by the housing 10.

The motor 3 is, for example, a three-phase brushless motor. The motor 3 is disposed on the rear housing 12 side in the space 5. That is, the motor 3 is housed in the housing 10. The motor 3 includes a stator 30, a coil 33, and a rotor 40.

The stator 30 is formed in a substantially annular shape. The stator 30 is unrotatably fixed to the rear housing 12 by being press-fitted into a plate 8 which is made of metal and fixed to the rear housing 12.

The stator 30 is, for example, made of a magnetic material such as iron. The stator 30 includes a stator core 31 and stator teeth 32. The stator core 31 is formed in an annular shape. The stator teeth 32 project inward in the radial direction from the stator core 31. The stator teeth 32 are formed at regular intervals in the circumferential direction of the stator core 31.

The coil 33 is wound around each of the stator teeth 32. The coil 33 is electrically connected to a bus bar 70. The bus bar 70 is disposed on the bottom of the rear housing 12 as illustrated in FIG. 1. Power supplied to the coil 33 flows through the bus bar 70. The bus bar 70 includes a terminal 71 which is connected to the coil 33. The coil 33 is electrically connected to the terminal 71. Power is supplied to the terminal 71 in accordance with a drive signal output from the ECU 2.

The rotor 40 is disposed inside the stator 30 in the radial direction. The rotor 40 includes a rotor core 41 and a magnet 42. The rotor core 41 is, for example, formed by laminating a plurality of thin plates made of a magnetic material such as iron in a plate-thickness direction. The rotor core 41 is formed in an annular shape, and press-fitted and fixed to the large-diameter part 22 of the input shaft 20. The magnet 42 is formed in an annular shape and disposed outside the rotor core 41 in the radial direction. The magnet 42 is polarized in such a manner that the N-pole and the S-pole are alternately arranged in the circumferential direction. The rotor 40 is rotatable relative to the housing 10 and the stator 30 together with the input shaft 20 by the rotor core 41 press-fitted and fixed to the input shaft 20.

When power is supplied to the coil 33, a magnetic force is produced in the stator teeth 32 around which the coils 33 are wound. Accordingly, the magnetic pole of the magnet 42 of the rotor 40 is attracted to the corresponding one of the stator teeth 32. The coils 33 constitute three phases, for example, a U phase, a V phase, and a W phase. When the ECU 2 switches energization to the U phase, the V phase, and the W phase in this order, the rotor 40 rotates, for example, to one side in the circumferential direction. On the other hand, when the ECU 2 switches the energization to the W phase, the V phase, and the U phase in this order, the rotor 40 rotates to the other side in the circumferential direction. In this manner, it is possible to rotate the rotor 40 in any direction by controlling the magnetic force produced in the stator teeth 32 by switching the energization of each of the coils 33.

In the present embodiment, relatively large cogging torque is produced by the magnetic force between the magnet 42 and the stator teeth 32. Thus, when the motor 3 is not energized, the rotor 40 may be locked at a predetermined rotation position.

In the present embodiment, a rotary encoder 72 is disposed between the bottom of the rear housing 12 and the rotor core 41. The rotary encoder 72 includes a magnet 73 and a Hall IC 75.

The magnet 73 is a multipolar magnet which is formed in an annular shape and polarized in such a manner that the N-pole and the S-pole are alternately arranged in the circumferential direction. The magnet 73 is coaxial with the rotor core 41 and disposed on an end of the rotor core 41 on the rear housing 12 side. A substrate 74 is disposed between the rear housing 12 and the cover 13. The Hall IC 75 is mounted on the substrate 74 so as to face the magnet 73.

The Hall IC 75 includes a Hall element and a signal conversion circuit. The Hall element is a magnetoelectric conversion element which uses a Hall effect and outputs an electric signal proportional to the density of magnetic flux generated by the magnet 73. The signal conversion circuit converts an output signal of the Hall element to a digital signal. The Hall IC 75 outputs a pulse signal synchronous with the rotation of the rotor core 41 to the ECU 2. The ECU 2 is capable of detecting the rotation angle and the rotation direction of the rotor core 41 on the basis of the pulse signal from the Hall IC 75.

The reduction gear 50 includes a ring gear 51 and a sun gear 52.

The ring gear 51 is, for example, made of metal such as iron and formed in an annular shape. The ring gear 51 is unrotatably fixed to the rear housing 12 together with the plate 8. The ring gear 51 is fixed to the housing 10 coaxially (the axis Ax1) with the input shaft 20. The ring gear 51 includes internal teeth 53 which are formed on the inner edge thereof.

The sun gear 52 is, for example, made of metal such as iron and formed in a substantially discoid shape. The sun gear 52 includes a projection 54 having a columnar shape. The projection 54 projects in a plate-thickness direction from a position away from the center of one face of the sun gear 52 outward in the radial direction by a predetermined distance. A plurality of projections 54 are formed at regular intervals in the circumferential direction of the sun gear 52. The sun gear 52 includes external teeth 55 which are formed on the outer edge of the sun gear 52 so as to mesh with the internal teeth 53 of the ring gear 51. The sun gear 52 is relatively rotatably and eccentrically disposed with respect to the input shaft 20 through a middle bearing 19 which is disposed on the outer periphery of the eccentric part 23 of the input shaft 20. Accordingly, when the input shaft 20 rotates, the sun gear 52 revolves while rotating on its own axis inside the ring gear 51 with the external teeth 55 meshing with the internal teeth 53 of the ring gear 51. The middle bearing 19 is, for example, a ball bearing like the front bearing 16 and the rear bearing 17.

The output gear 60 is, for example, made of metal. The output gear 60 includes an output tubular part 61 having a substantially cylindrical shape and a discoid part 62 having a substantially discoid shape. The output tubular part 61 is rotatably supported by the housing 10 through the metal bearing 18 which is disposed inside the front housing 11. The output tubular part 61 is coaxial with the large-diameter part 22 of the input shaft 20. The front bearing 16 is disposed inside the output tubular part 61. Accordingly, the output tubular part 61 rotatably supports the other end part 24 of the input shaft 20 through the metal bearing 18 and the front bearing 16.

The discoid part 62 is formed in a substantially discoid shape extending outward in the radial direction from an end of the output tubular part 61 on the sun gear 52 side in the space 5. A hole 63 is formed on the discoid part 62. The projection 54 of the sun gear 52 is insertable into the hole 63. The hole 63 penetrates the discoid part 62 in the plate-thickness direction. In the present embodiment, a plurality of holes 63 are formed in the circumferential direction of the discoid part 62 corresponding to the projections 54.

External teeth 64 are formed on the outer edge of the discoid part 62 throughout the entire area in the circumferential direction.

With the above configuration, when the sun gear 52 revolves while rotating on its own axis inside the ring gear 51, inner walls of the holes 63 of the discoid part 62 of the output gear 60 are pushed in the circumferential direction of the discoid part 62 by outer walls of the projections 54. Accordingly, a rotation component of the sun gear 52 is transmitted to the output gear 60. A speed of the rotation of the sun gear 52 is lower than a rotation speed of the input shaft 20. Thus, a rotation output of the motor 3 is decelerated and output from the output gear 60. In this manner, the ring gear 51 and the sun gear 52 function as the "reduction gear".

The output shaft 80 includes a shaft tubular part 81, a gear part 82, and a shaft hole 83.

The shaft tubular part 81 and the gear part 82 are, for example, made of metal. The shaft tubular part 81 is, for example, formed in a bottomed tubular shape. The gear part 82 is formed integrally with the shaft tubular part 81. The gear part 82 extends outward in the radial direction in a substantially sector shape from an outer peripheral wall of an end of the shaft tubular part 81 on the side opposite to the bottom of the shaft tubular part 81. External teeth 84 are formed on the outer edge of the gear part 82 on the side opposite to the shaft tubular part 81.

The output shaft 80 is disposed in the space 5 between the front housing 11 and the rear housing 12 in such a manner that the external teeth 84 mesh with the external teeth 64 of the output gear 60. The output shaft 80 is disposed in such a manner that an axis Ax2 of the shaft tubular part 81 is substantially parallel to the axis Ax1 of the input shaft 20.

When the motor 3 is driven to rotate to rotate the output gear 60, the output shaft 80 rotates about the axis Ax2 of the shaft tubular part 81. That is, the output shaft 80 rotates by torque output from the motor 3.

The output shaft 80 is disposed in such a manner that the shaft tubular part 81 is located inside a metal bearing 87 which is disposed on the front housing 11 and has a tubular shape. Accordingly, the output shaft 80 is rotatably supported by the front housing 11 through the metal bearing 87.

The shaft hole 83 penetrates the bottom of the shaft tubular part 81 in the axial direction. That is, the shaft hole 83 penetrates the shaft tubular part 81 of the output shaft 80 in the axis Ax2 direction. The shape of the shaft hole 83 will be described below.

As illustrated in FIG. 1, the output shaft 80 and the manual shaft 200 are coupled to each other by fitting one end of the manual shaft 200 of the shift-by wire system 100 with the shaft hole 83 of the output shaft 80. Accordingly, the output shaft 80 outputs torque of the motor 3 to the manual shaft 200 when the rotation of the input shaft 20 is transmitted to the output shaft 80 through the reduction gear 50 and the output gear 60.

Figure 3A:
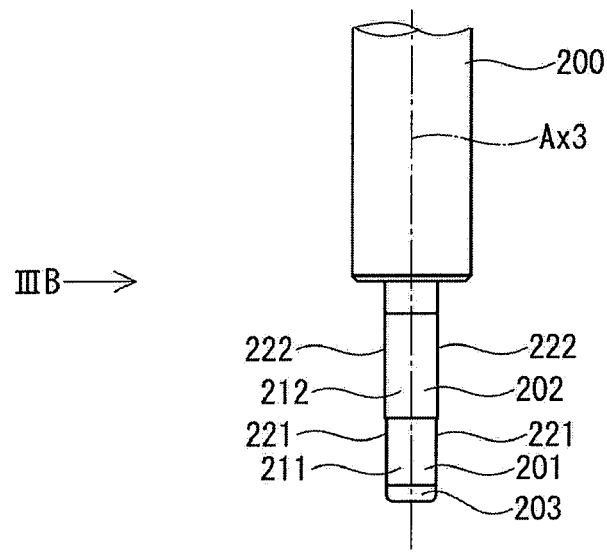
FIG. 3A is a front view of an end of a shaft.
Figure 3B:
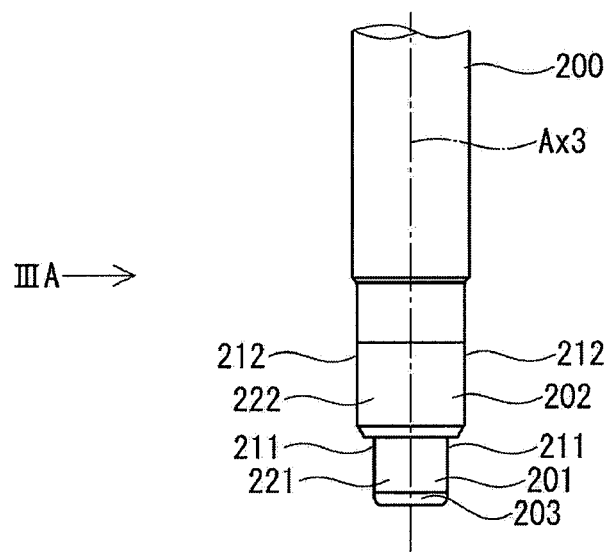
FIG. 3B is a diagram viewed from the direction of arrow IIIB of FIG. 3A.

As illustrated in FIGS. 3A and 3B, in the present embodiment, the manual shaft 200 includes a first fitting part 201, a second fitting part 202, and a tapered part 203.

The first fitting part 201 is formed on one end side of the manual shaft 200. The second fitting part 202 is formed on the other end side of the manual shaft 200 with respect to the first fitting part 201. The tapered part 203 is formed on the first fitting part 201 on the side opposite to the second fitting part 202. The tapered part 203 is formed in a tapered shape in such a manner that the tapered part 203 approaches an axis Ax3 of the manual shaft 200 from the other end side of the manual shaft 200 toward the one end side thereof.

A first curved part 211 and a first planar part 221 are formed on the first fitting part 201. The first curved part 211 is formed corresponding to a part of a virtual cylindrical plane centered at the axis Ax3. The diameter of the virtual cylindrical plane is smaller than the diameter of the manual shaft 200.

Two first curved parts 211 are formed on the first fitting part 201 with the axis Ax3 interposed therebetween. Two first planar parts 221 are formed on the first fitting part 201 with the axis Ax3 interposed therebetween between the two first curved parts 211. The two first planar parts 221 are each formed in a planar shape and parallel to each other. In this manner, the first fitting part 201 is formed in a so-called double-surface shape. As illustrated in FIG. 3A, the distance between the two first planar parts 221 is smaller than the diameter of the manual shaft 200.

A second curved part 212 and a second planar part 222 are formed on the second fitting part 202. The second curved part 212 is formed corresponding to a part of the virtual cylindrical plane centered at the axis Ax3. The diameter of the virtual cylindrical plane is smaller than the diameter of the manual shaft 200.

Two second curved parts 212 are formed on the second fitting part 202 with the axis Ax3 interposed therebetween. Two second planar parts 222 are formed on the second fitting part 202 with the axis Ax3 interposed therebetween between the two second curved parts 212. The two second planar parts 222 are each formed in a planar shape and parallel to each other. In this manner, the second fitting part 202 is formed in a so-called double-surface shape. As illustrated in FIG. 3A, the distance between the two second planar parts 222 is smaller than the diameter of the manual shaft 200 and substantially equal to the distance between the two first planar parts 221.

Figure 4:
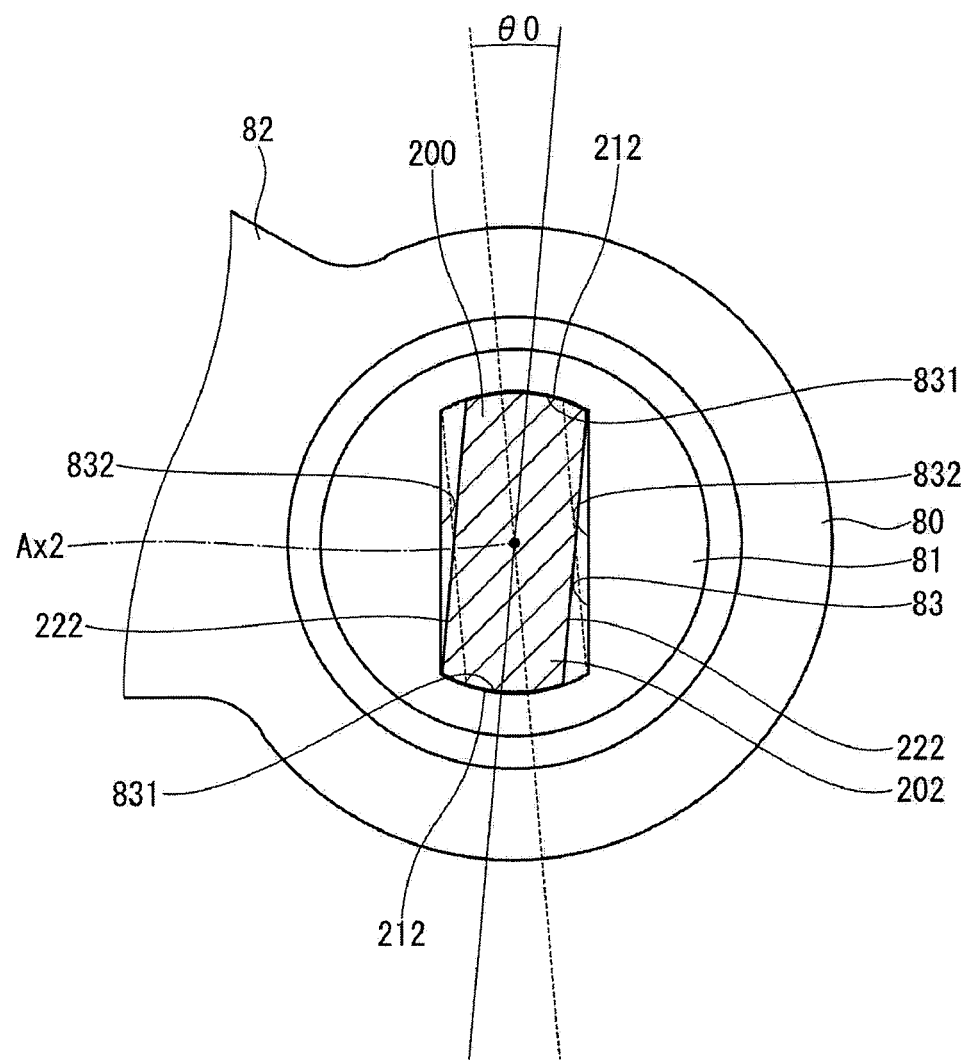
FIG. 4 is a diagram illustrating an output shaft and a shaft of the rotary actuator according to the first embodiment viewed from an axial direction.

As illustrated in FIGS. 1 and 4, in the present embodiment, the manual shaft 200 is fitted with the output shaft 80 in such a manner that the second fitting part 202 is located inside the shaft hole 83 of the output shaft 80. As illustrated in FIG. 4, the second fitting part 202 of the manual shaft 200 is formed in such a manner that a section perpendicular to the axis Ax3 has a curved shape in the second curved parts 212 and a linear shape in the second planar parts 222.

As illustrated in FIG. 4, the shaft hole 83 of the output shaft 80 includes a shaft hole curved part 831 and a shaft hole planar part 832. The shaft hole curved part 831 is formed corresponding to a part of a virtual cylindrical plane centered at the axis Ax2 of the shaft tubular part 81. Two shaft hole curved parts 831 are formed on the shaft hole 83 with the axis Ax2 interposed therebetween. Two shaft hole planar parts 832 are formed on the shaft hole 83 with the axis Ax2 interposed therebetween between the shaft hole curved parts 831. The two shaft hole planar parts 832 are each formed in a planar shape and parallel to each other. In this manner, the shaft hole 83 is formed in a so-called double-surface shape corresponding to the shape of the second fitting part 202.

As illustrated in FIG. 4, the distance between the two shaft hole curved parts 831 of the output shaft 80 is set slightly larger than the distance between the two second curved parts 212 of the manual shaft 200. On the other hand, the distance between the two shaft hole planar parts 832 of the output shaft 80 is set larger than the distance between the two second planar parts 222 of the manual shaft 200. Thus, the manual shaft 200 is rotatable relative to the output shaft 80 inside the shaft hole 83. When the manual shaft 200 rotates relative to the output shaft 80 inside the shaft hole 83, the shaft hole curved parts 831 and the second curved parts 212 are slidable, respectively. Further, at this time, the second planar parts 222 of the manual shaft 200 are capable of coming into contact with the shaft hole planar parts 832 of the shaft hole 83 only at ends on the second curved part 212 side. When the second curved parts 212 comes into contact with the shaft hole planar parts 832, the relative rotation between the output shaft 80 and the manual shaft 200 is restricted.

In this manner, in the present embodiment, a predetermined amount of play 80 which is equal to or larger than a first predetermined value is set between the manual shaft 200 and the output shaft 80. The first predetermined value is larger than zero. That is, the manual shaft 200 is rotatable relative to the output shaft 80 inside the shaft hole 83 within an angle range of the play 80 (refer to FIG. 4).

Figure 5:
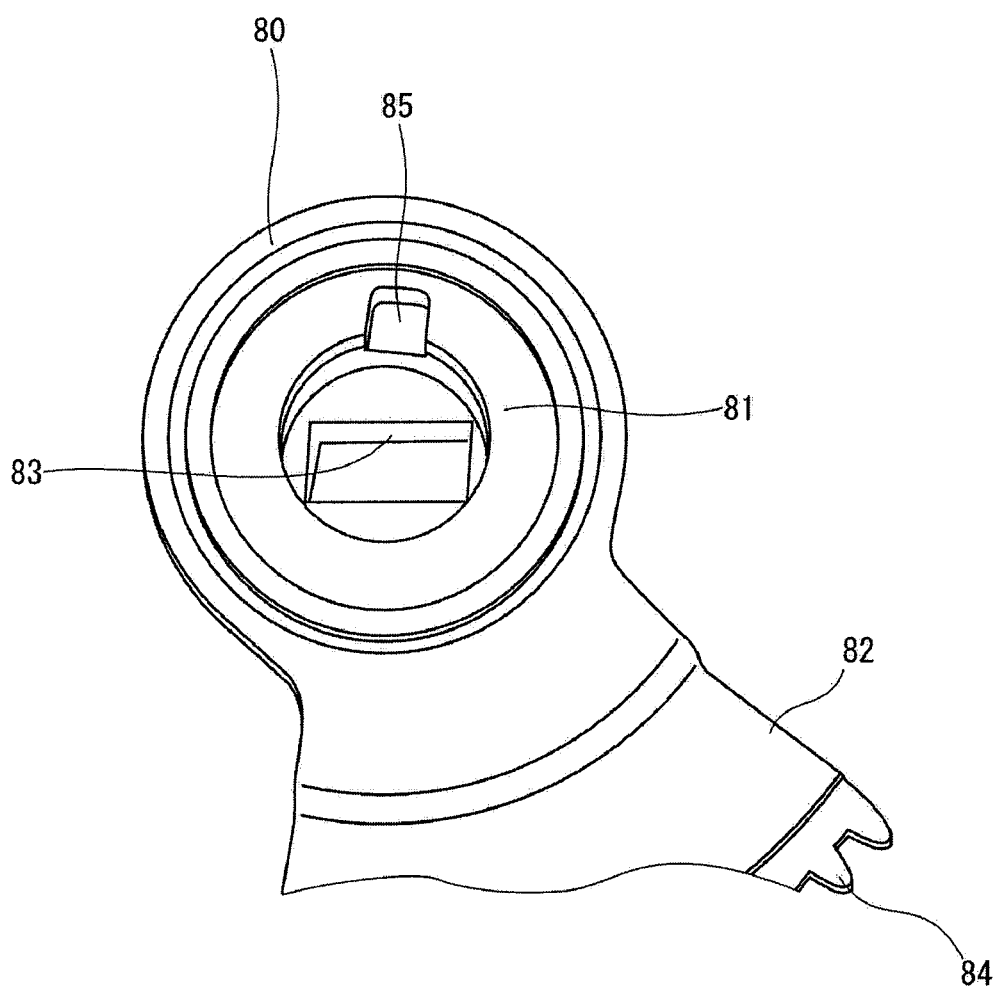
FIG. 5 is a perspective view of the output shaft of the rotary actuator according to the first embodiment.

As illustrated in FIGS. 1 and 5, a rotation restricting hole 85 is formed on an end face of the shaft tubular part 81 on the side opposite to the bottom of the shaft tubular part 81. The rotation restricting hole 85 is recessed toward the bottom from the end face on the side opposite to the bottom of the shaft tubular part 81.

As illustrated in FIGS. 1, and 6 to 9, the magnet holder 90 is formed separately from the output shaft 80. The magnet holder 90 includes a first holder tubular part 91, a second holder tubular part 92, a holder extending part 921, a holder hole 93, a slit 95, and a tapered part 96.

The first holder tubular part 91 and the second holder tubular part 92 are, for example, made of resin. That is, the magnet holder 90 is made of a material having an elastic modulus within a predetermined range which is, for example, lower than typical metal and higher than typical rubber.

The first holder tubular part 91 is, for example, formed in a substantially cylindrical shape. The second holder tubular part 92 is, for example, formed in a substantially bottomed cylindrical shape. The first holder tubular part 91 is formed integrally with the second holder tubular part 92. The first holder tubular part 91 extends from the bottom of the second holder tubular part 92 toward the side opposite to the tubular part of the second holder tubular part 92. The first holder tubular part 91 is coaxial (Ax4) with the second holder tubular part 92.

The holder extending part 921 annularly extends outward in the radial direction from an outer peripheral wall of an end of the second holder tubular part 92 on the side opposite to the first holder tubular part 91.

As illustrated in FIG. 1, the magnet holder 90 is disposed between the output shaft 80 and the rear housing 12. More specifically, the magnet holder 90 is disposed coaxially with the shaft tubular part 81 in such a manner that the first holder tubular part 91 is located inside an end of the shaft tubular part 81 of the output shaft 80 on the side opposite to the bottom of the shaft tubular part 81, and the bottom of the second holder tubular part 92 faces or abuts on an end face of the shaft tubular part 81 on the side opposite to the bottom of the shaft tubular part 81.

The holder hole 93 is formed inside the first holder tubular part 91. That is, one end of the holder hole 93 is closed by the bottom of the second holder tubular part 92. The holder hole 93 communicates with the shaft hole 83 of the output shaft 80.

Figure 6:
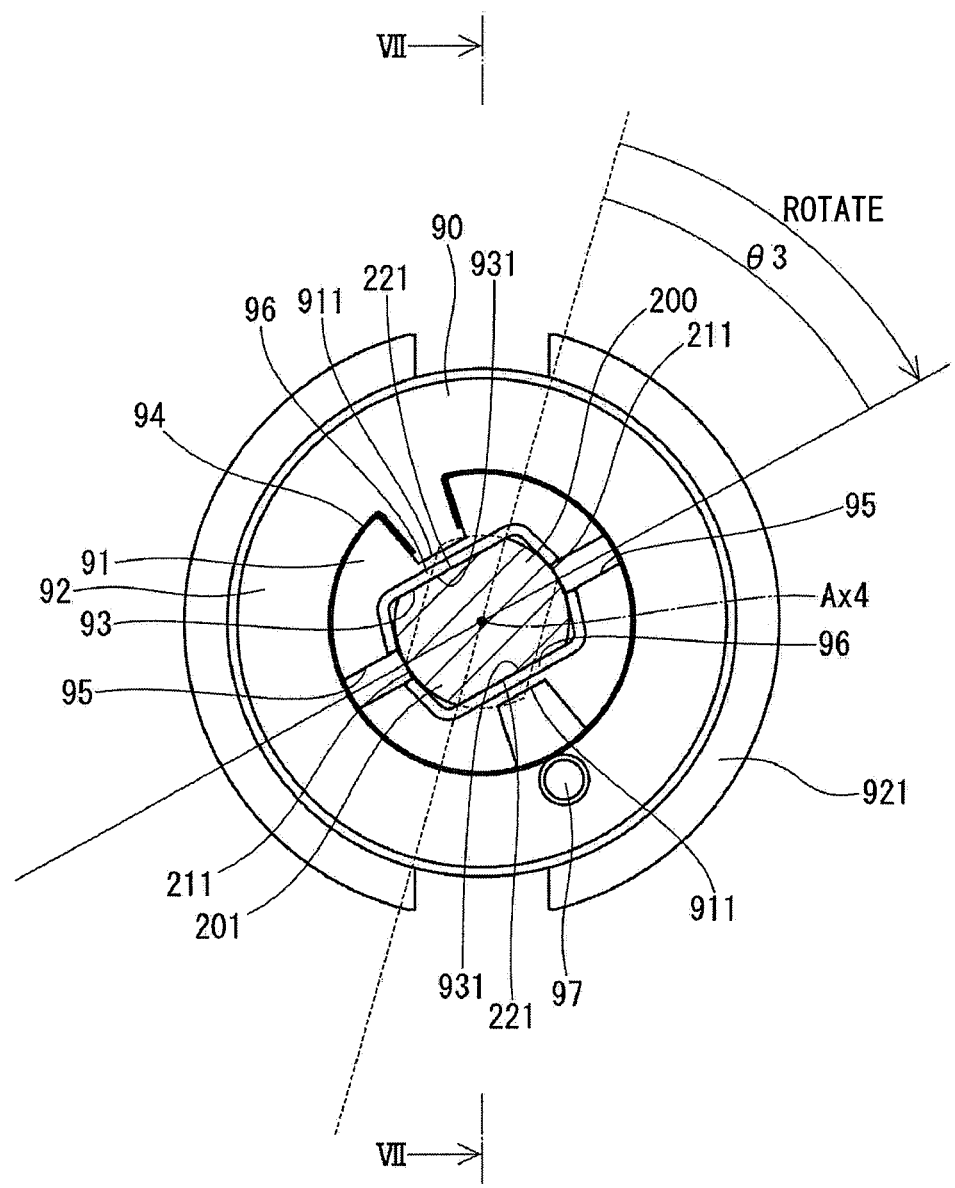
FIG. 6 is a diagram illustrating a magnet holder of the rotary actuator according to the first embodiment viewed from the axial direction.

As illustrated in FIG. 6, the holder hole 93 of the magnet holder 90 includes a holder hole planar part 931. Two holder hole planar parts 931 are formed on the holder hole 93 with the axis Ax4 of the magnet holder 90 interposed therebetween. The two holder hole planar parts 931 are each formed in a planar shape and parallel to each other. In this manner, the holder hole 93 is formed in a so-called double-surface shape.

The slit 95 is formed on the first holder tubular part 91. The slit 95 is formed in a cut-away shape in a part in the circumferential direction of the first holder tubular part 91. That is, the slit 95 is formed by cutting away a part of the holder hole 93 in the circumferential direction. In the present embodiment, two slits 95 are formed at regular intervals in the circumferential direction of the first holder tubular part 91. That is, the two slits 95 are formed on the first holder tubular part 91 with the axis Ax4 of the magnet holder 90 interposed therebetween. The two slits 95 are formed between the two holder hole planar parts 931 in the holder hole 93. The slits 95 enable the first holder tubular part 91 to easily deform inward in the radial direction.

The tapered part 96 is formed in a tapered shape in such a manner that the tapered part 96 approaches the axis (Ax4) of the holder hole 93 from the shift range switching device 110 side toward the side opposite to the shift range switching device 110 in a part of the holder hole 93 on the manual shaft 200 side of the shift range switching device 110.

As illustrated in FIGS. 1 and 6, in the present embodiment, the manual shaft 200 is fitted with the magnet holder 90 in such a manner that the first fitting part 201 is located inside the holder hole 93 of the magnet holder 90. As illustrated in FIG. 6, the first fitting part 201 of the manual shaft 200 is formed in such a manner that a section perpendicular to the axis Ax3 has a curved shape in the first curved parts 211 and a linear shape in the first planar parts 221.

For example, when an operator fits the manual shaft 200 with the holder hole 93, the manual shaft 200 passes through the shaft hole 83 of the output shaft 80 and relatively moves in the axis Ax3 direction with the tapered part 203 abutting on the tapered part 96 of the magnet holder 90. At this time, when the rotation angle of the manual shaft 200 is an angle at which the first planar parts 221 do not correspond to the holder hole planar parts 931, the manual shaft 200 rotates relative to the magnet holder 90 so that the first planar parts 221 correspond to the holder hole planar parts 931 (refer to FIG. 6).

As illustrated in FIG. 6, the distance between the two holder hole planar parts 931 of the holder hole 93 is set equal to or slightly smaller than the distance between the two first planar parts 221 of the manual shaft 200. Further, the distance between the two slits 95 of the holder hole 93 is set equal to or slightly smaller than the distance between the two first curved parts 211 of the manual shaft 200. Thus, in a state in which the first fitting part 201 is fitted with the holder hole 93, the first planar parts 221 are in close contact with the holder hole planar parts 931, and the first curved parts 211 are in close contact with parts of the slits 95 of the holder hole 93 in the manual shaft 200. Accordingly, the magnet holder 90 and the manual shaft 200 are relatively unrotatable. Thus, the magnet holder 90 rotates integrally with the manual shaft 200.

In this manner, in the present embodiment, a play amount between the manual shaft 200 and the holder hole 93 is set to zero. That is, the play amount between the manual shaft 200 and the holder hole 93 is set to a second predetermined value or smaller. In the present embodiment, the second predetermined value is zero. That is, the play amount between the manual shaft 200 and the holder hole 93 is zero.

As illustrated in FIG. 1, the rear housing 12 includes a thrust load receiver 14. The thrust load receiver 14 is formed on the face of the rear housing 12 on the front housing 11 side at a position facing the holder extending part 921 of the magnet holder 90.

The washer 922 is, for example, made of a metal thin plate and formed in a substantially annular shape. The washer 922 is, for example, coated with fluororesin.

The washer 922 is disposed between the holder extending part 921 and the thrust load receiver 14. For example, when an operator fits the manual shaft 200 with the holder hole 93, a load in the axial direction from the magnet holder 90 acts on the thrust load receiver 14 through the washer 922. Also after the manual shaft 200 is fitted with the holder hole 93, the load in the axial direction from the magnet holder 90 acts on the thrust load receiver 14 through the washer 922. In the present embodiment, the washer 922 is capable of preventing wear of the magnet holder 90. Since the washer 922 is coated with fluororesin, a frictional force between the thrust load receiver 14 of the rear housing 12 and the magnet holder 90 is reduced. Accordingly, the magnet holder 90 is smoothly rotatable relative to the rear housing 12.

Figure 7:
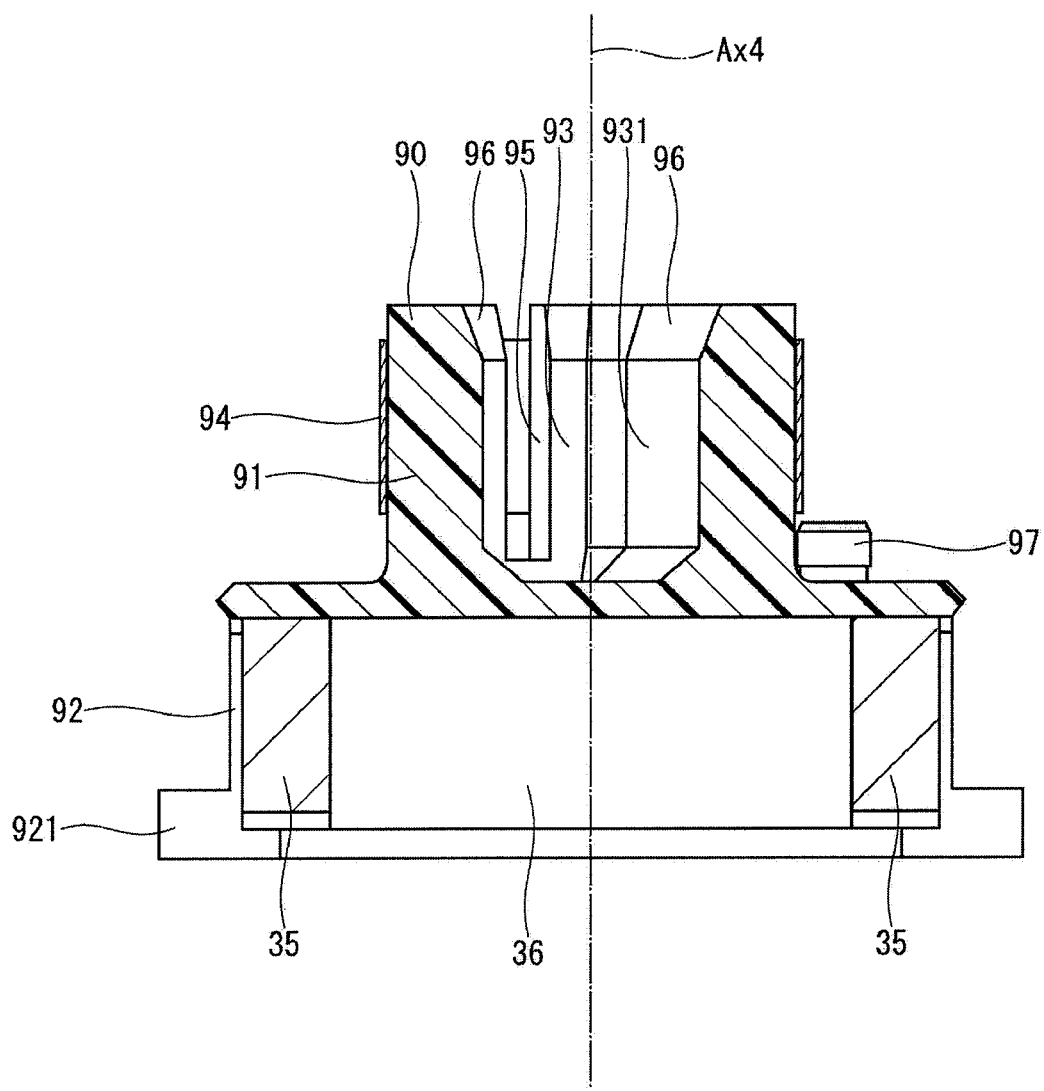
FIG. 7 is a sectional view taken along line VII-VII of FIG. 6.

As illustrated in FIGS. 1, 6, and 7, a rotation restricting pin 97 is formed on the magnet holder 90. The rotation restricting pin 97 is formed integrally with the second holder tubular part 92, and projects from the bottom of the second holder tubular part 92 toward the first holder tubular part 91. The magnet holder 90 and the output shaft 80 are assembled together with the rotation restricting pin 97 fitted in the rotation restricting hole 85 of the output shaft 80. In this state, the relative rotation between the magnet holder 90 and the output shaft 80 is restricted. The rotation restricting pin 97 and the rotation restricting hole 85 correspond to the "rotation restrictor".

Even in a state in which the rotation restricting pin 97 is fitted in the rotation restricting hole 85, the magnet holder 90 and the output shaft 80 are relatively rotatable within a predetermined angle range. That is, a predetermined amount of play is set between the magnet holder 90 and the output shaft 80 in the rotation restrictor.

In a state in which the rotation restricting pin 97 is fitted in the rotation restricting hole 85, the holder hole planar part 931 is substantially parallel to the shaft hole planar part 832. Thus, it is easy to fit the first fitting part 201 of the manual shaft 200 with the holder hole 93.

Figure 8:
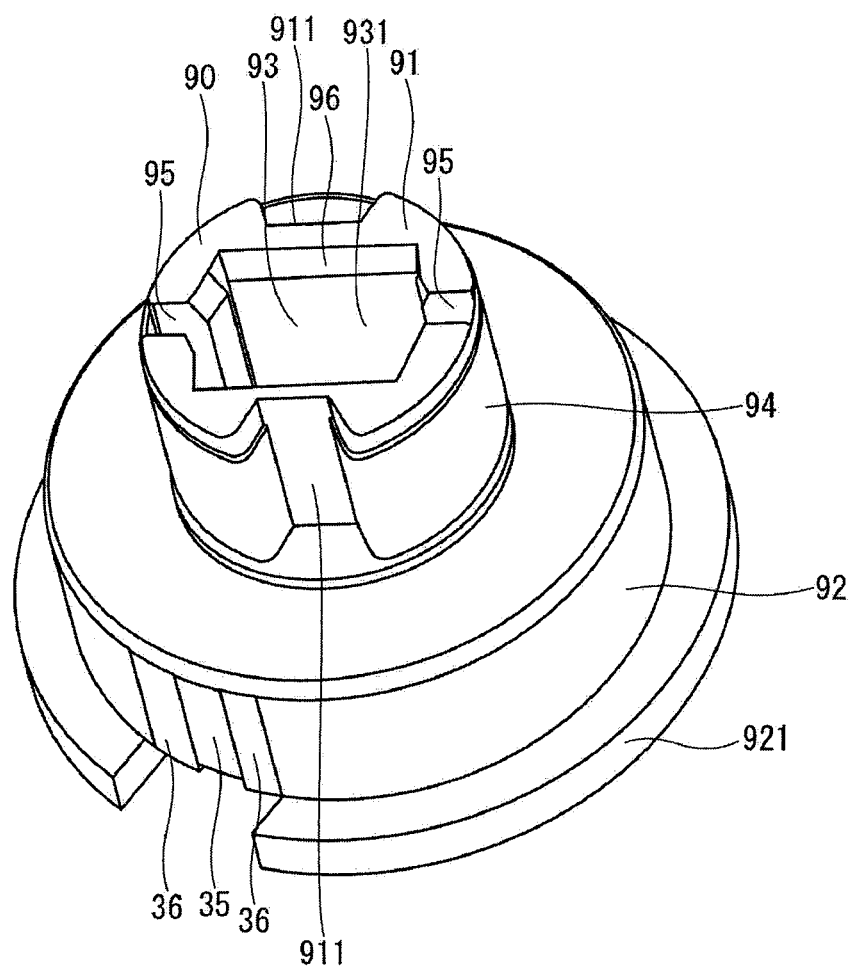
FIG. 8 is a perspective view of the magnet holder of the rotary actuator according to the first embodiment.

As illustrated in FIGS. 6 and 8, a holder recess 911 is formed on the first holder tubular part 91. The holder recess 911 is recessed inward in the radial direction from the outer peripheral wall of the first holder tubular part 91. In the present embodiment, two holder recesses 911 are formed at regular intervals in the circumferential direction of the first holder tubular part 91. The holder recesses 911 are formed between the two slits 95.

The spring 94 is, for example, formed by winding a metal thin plate having an elongated shape in the longitudinal direction by substantially one round. Both ends in the longitudinal direction of the spring 94 are bent inward in the radial direction. The spring 94 is disposed outside the first holder tubular part 91 in the radial direction with both the ends locked to one of the holder recesses 911. A biasing force acts on the first holder tubular part 91 inward in the radial direction from the spring 94. Accordingly, the spring 94 is capable of fastening the first holder tubular part 91 to the manual shaft 200 with the manual shaft 200 fitted with the holder hole 93.

Figure 9:
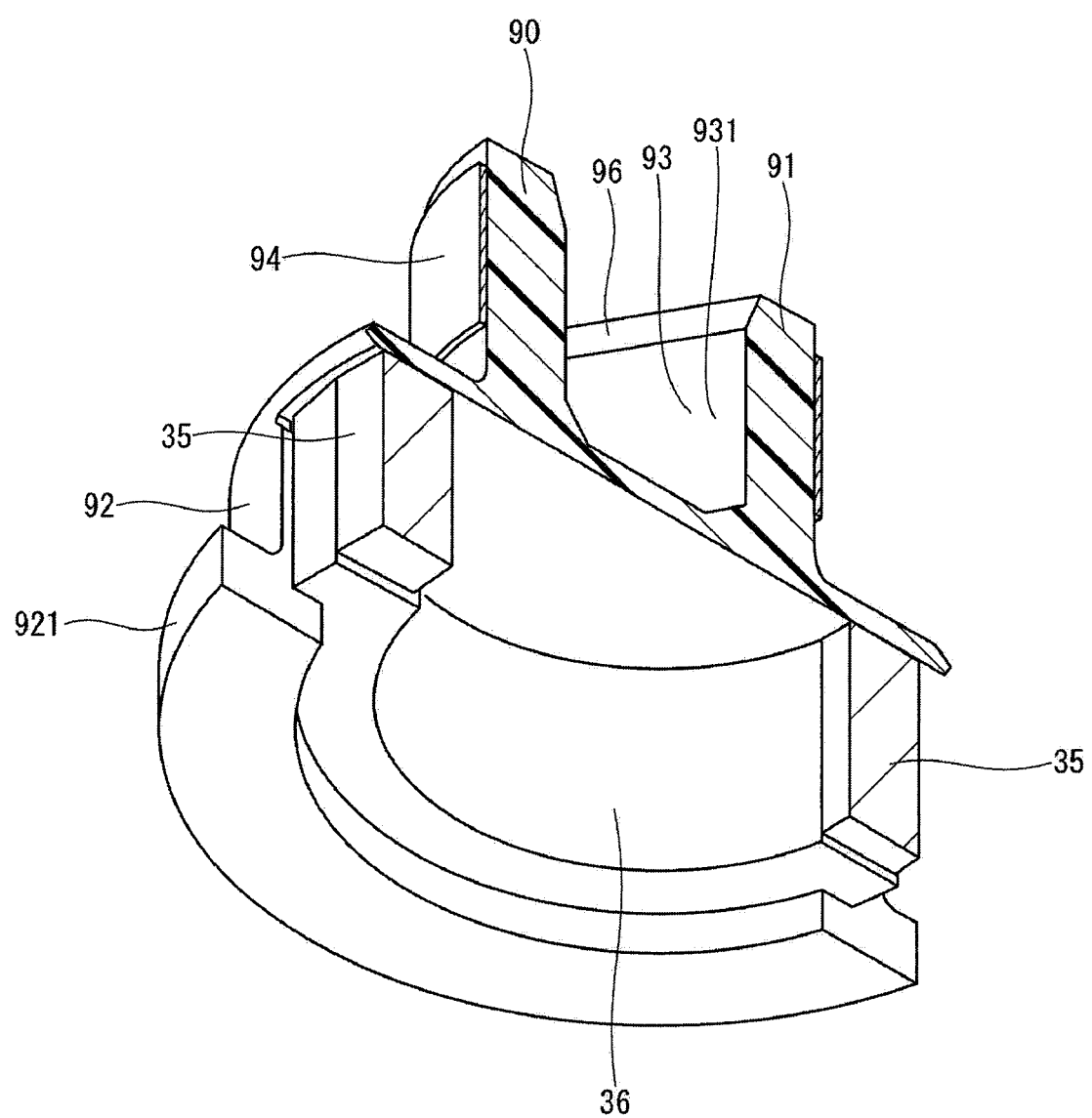
FIG. 9 is a perspective sectional view of the magnet holder of the rotary actuator according to the first embodiment.

As illustrated in FIGS. 7 to 9, the magnet holder 90 is provided with two yokes 36. Each of the yokes 36 is, for example, made of a magnetic material such as iron and formed in a substantially arc shape. The yokes 36 are formed inside the second holder tubular part 92 in such a manner that each end of one of the yokes 36 faces the corresponding end of the other yoke 36 with a space therebetween.

Two magnets 35 in total are provided. Each of the magnets 35 is disposed in the space between the ends of the two yokes 36. The magnetic poles of the two magnets 35 abut on the ends of the yokes 36. Accordingly, magnetic flux generated from the magnets 35 flows through the yokes 36. The magnetic flux flowing through the yokes 36 flies in the space between the two yokes 36 as leakage flux.

The two yokes 36 and the two magnets 35 are unrotatable relative to the magnet holder 90 and rotate together with the magnet holder 90.

The angle sensor 45 includes a Hall element and a signal conversion circuit. The angle sensor 45 is disposed in such a manner that the Hall element is located inside the second holder tubular part 92 of the magnet holder 90, that is, inside the two yokes 36 and the two magnets 35. The angle sensor 45 is supported by a support member 46 which is attached to the rear housing 12. The angle sensor 45 is disposed on the axes (Ax3, Ax4) of the shaft tubular part 81 of the output shaft 80 and the magnet holder 90. That is, the magnet holder 90 and the angle sensor 45 are located on the axis Ax2 of the manual shaft 200.

The angle sensor 45 includes a terminal which is connected to the Hall element and the signal conversion circuit, and the terminal is connected to the substrate 74. The angle sensor 45 is capable of detecting magnetic flux from the magnets 35 inside the two yokes 36 and outputting a signal corresponding to the rotation angle of the magnet holder 90 to the ECU 2. Accordingly, the ECU 2 can detect the rotation angle of the magnet holder 90. In the present embodiment, the magnet holder 90 rotates integrally with the manual shaft 200. Thus, the ECU 2 can detect the rotation angle of the manual shaft 200 from the rotation angle of the magnet holder 90.

In the present embodiment, when $\theta 1$ denotes a variation in the accuracy of positioning the manual shaft 200 in the holding mechanism (the detent plate 102, the leaf spring 106, and the stopper 107) when the motor 3 drives the manual shaft 200, and $\theta 2$ denotes a play amount between the manual shaft 200 and the motor 3, $\theta 1 < \theta 2$. Here, $\theta 2$ is a play in a torque transmission path between the motor 3, the reduction gear 50, the output gear 60, the output shaft 80, and the manual shaft 200, that is, from the motor 3 to the manual shaft 200. Thus, even when the motor 3 is in a stopped state, the manual shaft 200 is rotatable within the range of $\theta 2$.

When $\theta 3$ denotes a correction angle which is a maximum relative rotation angle when the magnet holder 90 and the manual shaft 200 relatively rotate by the end of the manual shaft 200 moving in the axial direction while making contact with the tapered part 96 when the manual shaft 200 is fitted with the holder hole 93, and $\theta 4$ denotes a play amount between the magnet holder 90 and the output shaft 80 in the rotation restrictor (the rotation restricting pin 97 and the rotation restricting hole 85), $\theta 3 - \theta 4 > \theta 2$.

In the present embodiment, the play $\theta 0$ between the manual shaft 200 and the output shaft 80 is smaller than $\theta 4$. Thus, it is possible to prevent generation of a stress on the magnet holder 90 when the manual shaft 200 rotates by the rotation of the output shaft 80.

Next, attachment of the rotary actuator 1 to the shift range switching device 110 will be described.
(Shaft Fitting Process)

First, an operator fits the first fitting part 201 with the holder hole 93 and fits the second fitting part 202 with the shaft hole 83 with the rotation position of the first fitting part 201 and the second fitting part 202 of the manual shaft 200 corresponding to the shaft hole 83 of the output shaft 80. In the present embodiment, each of the shaft hole 83, the first fitting part 201, and the second fitting part 202 has a double-surface shape. Thus, it is easy to allow the rotation position of the first fitting part 201 and the second fitting part 202 to correspond to the shaft hole 83 of the output shaft 80.

In the present embodiment, the relative rotation between the magnet holder 90 and the output shaft 80 is restricted by the rotation restricting pin 97 and the rotation restricting hole 85, and the rotation position of the holder hole 93 and the shaft hole 83 is adjusted. Thus, it is possible to easily fit the first fitting part 201 with the holder hole 93.

In the present embodiment, the tapered part 96 is formed on the magnet holder 90, and the tapered part 203 is formed on the manual shaft 200. Thus, when the manual shaft 200 is fitted with the holder hole 93, the tapered part 203 on the end of the manual shaft 200 moves in the axial direction while making contact with the tapered part 96, and the magnet holder 90 and the manual shaft 200 thereby relatively rotate. Thus, even when a relative angle between the manual shaft 200 and the holder hole 93 is inappropriate before fitting of the manual shaft 200 with the holder hole 93, the manual shaft 200 is fitted with the holder hole 93 with the relative angle corrected.
(Actuator Attaching Process)

After the fitting of the manual shaft 200 with the output shaft 80 and the magnet holder 90, the operator fixes the rotary actuator 1 to the wall 130 of the shift range switching device 110.

Next, an operation of the rotary actuator 1 will be described.

When a driver requests switching to a desired shift range, the ECU 2 energizes the motor 3. When the motor 3 rotates by the energization of the motor 3, torque of the motor 3 is transmitted to the output shaft 80 through the reduction gear 50 and the output gear 60. When the output shaft 80 rotates by the torque transmitted to the output shaft 80, the shaft hole planar parts 832 of the shaft hole 83 of the output shaft 80 rotates while abutting on the second planar parts 222 of the second fitting part 202 of the manual shaft 200. Accordingly, the manual shaft 200 rotates, and the stopper 107 of the holding mechanism moves in the recesses 151 to 154 of the detent plate 102.

When a rotation amount of the motor 3 becomes a rotation amount corresponding to the shift range requested by the driver, the ECU 2 stops the energization of the motor 3. Accordingly, the stopper 107 is fitted in any of the recesses 151 to 154, and the rotation position of the manual shaft 200 is held at a predetermined position.

When the manual shaft 200 is driven to rotate by the motor 3, the magnet holder 90 rotates integrally with the manual shaft 200. At this time, the ECU 2 can detect the rotation angle of the manual shaft 200 from a signal from the angle sensor 45.

As described above, the present embodiment provides the rotary actuator 1 which is capable of rotating the manual shaft 200 of the shift range switching device 110 and provided with the housing 10, the motor 3, the output shaft 80, the magnet holder 90, the magnet 35, and the angle sensor 45.

The motor 3 is disposed inside the housing 10.

The output shaft 80 includes the shaft hole 83 with which the manual shaft 200 is fittable, rotates by torque output from the motor 3, and outputs torque to the manual shaft 200.

The magnet holder 90 is formed separately from the output shaft 80, includes the holder hole 93 with which the manual shaft 200 is fittable, and is rotatable together with the manual shaft 200.

The magnet 35 is disposed on the magnet holder 90.

The angle sensor 45 is capable of detecting magnetic flux from the magnet 35 and outputting a signal corresponding to the rotation angle of the magnet holder 90. Accordingly, it is possible to detect the rotation angle of the manual shaft 200.

The play amount between the manual shaft 200 and the shaft hole 83 is set to a first predetermined value or larger. Thus, it is possible to easily fit the manual shaft 200 with the shaft hole 83 and improve the assemblability between the manual shaft 200 and the output shaft 80.

The play amount between the manual shaft 200 and the holder hole 93 is set to a second predetermined value or smaller. Accordingly, the relative rotation between the manual shaft 200 and the magnet holder 90 is restricted, and the magnet holder 90 is rotatable integrally with the manual shaft 200. Thus, it is possible to increase the accuracy of detecting the rotation angle of the manual shaft 200 by the angle sensor 45.

In the present embodiment, the output shaft 80 and the magnet holder 90 are separately formed. Thus, the output shaft 80 and the magnet holder 90 are relatively rotatable, and it is possible to prevent generation of a stress on the magnet holder 90 when the output shaft 80 and the manual shaft 200 relatively rotate within the range of the play.

In the present embodiment, the output shaft 80 is disposed between the magnet holder 90 and the shift range switching device 110. Thus, it is possible to dispose the magnet holder 90 on the tip of the manual shaft 200 and dispose the angle sensor 45 inside the magnet holder 90. Accordingly, the rotary actuator 1 can be downsized.

In the present embodiment, the shaft hole 83 penetrates the output shaft 80 in the axial direction. Thus, it is possible to downsize and slim down the rotary actuator 1.

In the present embodiment, the magnet holder 90 and the angle sensor 45 are disposed on the axis of the manual shaft 200. Thus, it is possible to prevent axis misalignment between the magnet holder 90, the angle sensor 45, and the manual shaft 200 to improve the detection accuracy of the angle sensor 45. Accordingly, it is possible to accurately detect the rotation angle of the manual shaft 200.

In the present embodiment, the magnet holder 90 is made of a material having an elastic modulus within a predetermined range. Thus, it is possible to eliminate a play between the magnet holder 90 and the manual shaft 200 to further improve the accuracy of detecting the rotation angle of the manual shaft 200.

The present embodiment further includes the spring 94. The spring 94 is disposed outside the holder hole 93 in the radial direction. The spring 94 is capable of fastening the magnet holder 90 to the manual shaft 200. Thus, it is possible to reliably fix the magnet holder 90 and the manual shaft 200 to improve vibration proof. Accordingly, it is possible to further improve the accuracy of detecting the rotation angle of the manual shaft 200.

In the present embodiment, the magnet holder 90 includes the slit 95 having a cut-away shape in a part in the circumferential direction of the holder hole 93. Thus, it is possible to facilitate deformation of the holder hole 93 and eliminate a play between the magnet holder 90 and the manual shaft 200 while coping with variations in the dimension of the manual shaft 200.

In the present embodiment, the housing 10 includes the thrust load receiver 14 on which the load in the axial direction from the magnet holder 90 acts.

The present embodiment further includes the washer 922 which is disposed between the magnet holder 90 and the thrust load receiver 14. Thus, it is possible to fit and fasten the manual shaft 200 and the magnet holder 90 with each other merely by attaching the rotary actuator 1 to the shift range switching device 110 with the manual shaft 200 and the shaft hole 83 corresponding to each other. Accordingly, it is possible to improve the assemblability. Further, it is possible to prevent wear of the magnet holder 90 by the washer 922.

In the present embodiment, the shift range switching device 110 includes the detent plate 102, the leaf spring 106, and the stopper 107 as the holding mechanism capable of positioning the manual shaft 200 by holding the rotation position of the manual shaft 200 at a predetermined position.

When $\theta 1$ denotes a variation in the accuracy of positioning the manual shaft 200 in the holding mechanism when the motor 3 drives the manual shaft 200, and $\theta 2$ denotes the play amount between the manual shaft 200 and the motor 3, $\theta 1 < \theta 2$. Accordingly, the stopper 107 of the holding mechanism is accurately fitted into the recesses 151 to 154 of the detent plate 102, which prevents a reduction in the positioning accuracy for the shift position.

In the present embodiment, even when the rotor 40 is locked at a predetermined rotation position during non-energization of the motor 3, the stopper 107 of the holding mechanism can be accurately fitted into the recesses 151 to 154 of the detent plate 102. Thus, the present embodiment is suitable for the motor 3 which includes the magnet 42 and in which relatively large cogging torque is produced.

In the present embodiment, the magnet holder 90 includes the tapered part 96 which is formed in a tapered shape in such a manner that the tapered part 96 approaches the axis of the holder hole 93 from the shift range switching device 110 side toward the side opposite to the shift range switching device 110 in a part of the holder hole 93 on the shift range switching device 110 side. Thus, when the manual shaft 200 is fitted with the holder hole 93, the tapered part 203 on the end of the manual shaft 200 moves in the axial direction while making contact with the tapered part 96, and the magnet holder 90 and the manual shaft 200 thereby relatively rotate. Accordingly, even when the relative angle between the manual shaft 200 and the holder hole 93 is inappropriate before fitting of the manual shaft 200 with the holder hole 93, the manual shaft 200 is fitted with the holder hole 93 with the relative angle corrected. Thus, it is possible to improve the assemblability.

The present embodiment further includes the rotation restricting pin 97 and the rotation restricting hole 85 as the rotation restrictor.

The rotation restricting pin 97 and the rotation restricting hole 85 are capable of restricting the relative rotation between the magnet holder 90 and the output shaft 80. Thus, it is possible to easily fit the manual shaft 200 with the shaft hole 83 and the holder hole 93 by restricting the relative rotation in a range to which the relative rotation position with the holder hole 93 and the shaft hole 83 substantially corresponds. Accordingly, it is possible to improve the assemblability.

In the present embodiment, when $\theta 2$ denotes the play amount between the manual shaft 200 and the motor 3, $\theta 3$ denotes the correction angle which is the maximum relative rotation angle when the magnet holder 90 and the manual shaft 200 relatively rotate by the end of the manual shaft 200 moving in the axial direction while making contact with the tapered part 96 when the manual shaft 200 is fitted with the holder hole 93, and θ4 denotes the play amount between the magnet holder 90 and the output shaft 80 in the rotation restricting pin 97 and the rotation restricting hole 85, θ3−θ4>θ2. Thus, it is possible to perform angle alignment between the manual shaft 200 and the magnet holder 90 merely by attaching the rotary actuator 1 to the shift range switching device 110 with the manual shaft 200 and the shaft hole 83 corresponding to each other. Accordingly, it is possible to improve the assemblability.

Second Embodiment

Figure 10:
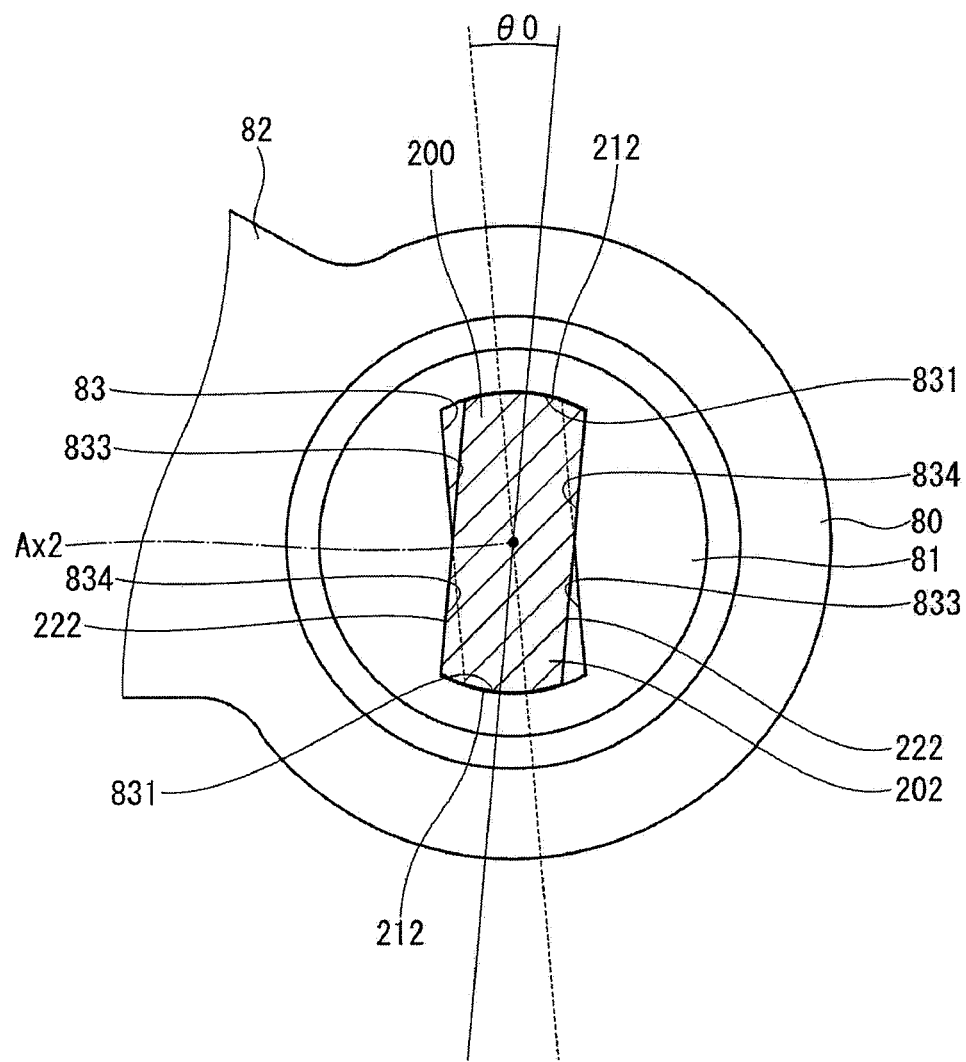
FIG. 10 is a diagram illustrating an output shaft and a shaft of a rotary actuator according to a second embodiment viewed from the axial direction.

FIG. 10 illustrates a part of a rotary actuator according to a second embodiment. The second embodiment differs from the first embodiment in the shape of a shaft hole 83 of an output shaft 80.

In the second embodiment, the shaft hole 83 of the output shaft 80 includes a shaft hole curved part 831, a first shaft hole planar part 833, and a second shaft hole planar part 834. The shaft hole curved part 831 is formed corresponding to a part of a virtual cylindrical plane centered at the axis Ax2 of the shaft tubular part 81. Two shaft hole curved parts 831 are formed on the shaft hole 83 with the axis Ax2 interposed therebetween.

Two first shaft hole planar parts 833 are formed on the shaft hole 83 in such a manner that each of the first shaft hole planar parts 833 extends from an end in the circumferential direction of one of the shaft hole curved parts 831 toward the other shaft hole curved part 831. The two first shaft hole planar parts 833 are formed in a planar shape and extend from the respective different shaft hole curved parts 831. The two first shaft hole planar parts 833 are parallel to each other with an axis Ax2 interposed therebetween.

Two second shaft hole planar parts 834 are formed on the shaft hole 83 in such a manner that each of the second shaft hole planar parts 834 extends from an end in the circumferential direction of one of the shaft hole curved parts 831 on the side opposite to the first shaft hole planar part 833 toward the other shaft hole curved part 831 so as to be connected to the first shaft hole planar part 833. The two second shaft hole planar parts 834 are formed in a planar shape and extend from the respective different shaft hole curved parts 831. The two second shaft hole planar parts 834 are parallel to each other with the axis Ax2 interposed therebetween.

As illustrated in FIG. 10, the first shaft hole planar part 833 and the second shaft hole planar part 834 that face each other approach each other from the shaft hole curved part 831 toward the axis Ax2. In this manner, in the present embodiment, the shaft hole 83 is formed in such a manner that a section perpendicular to the axis Ax2 has an hourglass shape.

The distance between two virtual planes which respectively include the two first shaft hole planar parts 833 and the distance between two virtual planes which respectively include the two second shaft hole planar parts 834 are set substantially equal to the distance between the two second planar parts 222 of the manual shaft 200. Thus, when the manual shaft 200 rotates relative to the output shaft 80 inside the shaft hole 83, the shaft hole curved parts 831 and the second curved parts 212 are slidable. At this time, the second planar parts 222 of the manual shaft 200 are capable of coming into surface contact with the first shaft hole planar parts 833 or the second shaft hole planar parts 834. When the second planar parts 222 come into surface contact with the first shaft hole planar parts 833 or the second shaft hole planar parts 834, the relative rotation between the output shaft 80 and the manual shaft 200 is restricted.

In the present embodiment, since the relative rotation between the output shaft 80 and the manual shaft 200 is restricted by the surface contact between the second planar parts 222 and the first shaft hole planar parts 833 or the second shaft hole planar parts 834, it is possible to reduce wear of the output shaft 80 and the manual shaft 200 compared to the first embodiment.

The second embodiment has a configuration similar to the configuration of the first embodiment except the point described above. Thus, the second embodiment can achieve effects similar to the effects of the first embodiment.

In the second embodiment, a predetermined amount of play 80 which is equal to or larger than a first predetermined value is set between the manual shaft 200 and the output shaft 80 in a manner similar to the first embodiment. The first predetermined value is larger than zero. That is, the manual shaft 200 is rotatable relative to the output shaft 80 within an angle range of the play 80 inside the shaft hole 83 (refer to FIG. 10).

Other Embodiments

In another embodiment of the present disclosure, the output shaft 80 may be disposed on the side opposite to the shift range switching device 110 with respect to the magnet holder 90. That is, the magnet holder 90 may be disposed between the output shaft 80 and the shift range switching device 110. In this configuration, the holder hole 93 may penetrate the magnet holder 90 in the axial direction, and the manual shaft 200 inserted through the holder hole 93 may be fitted with the shaft hole 83 of the output shaft 80. Further, in this configuration, the angle sensor 45 cannot be disposed on the axis of the manual shaft 200. Thus, it is required that the angle sensor 45 be disposed near the yokes 36 except on the axis of the manual shaft 200.

In another embodiment of the present disclosure, the magnet holder 90 is not limited to be made of resin, and may be made of any material having an elastic modulus within a predetermined range, for example, nonmagnetic metal such as brass or stainless steel or rubber having an elastic modulus of a predetermined value or higher. Alternatively, the magnet holder 90 may be made of metal, and the holder hole 93 may be coated with rubber or resin. In such a configuration, it is possible to restrict the relative rotation between the manual shaft 200 and the magnet holder 90 without reducing the assemblability between the manual shaft 200 and the magnet holder 90.

In another embodiment of the present disclosure, the output shaft 80 and the magnet holder 90 may be integrally formed of the same material or different materials. Even when the output shaft 80 and the magnet holder 90 are integrally formed, it is possible to increase the accuracy of detecting the rotation angle of the manual shaft 200 by the angle sensor 45 while improving the assemblability between the manual shaft 200 and the output shaft 80 by setting the play amount between the manual shaft 200 and the shaft hole 83 to the first predetermined value or larger and setting the play amount between the manual shaft 200 and the holder hole 93 to the second predetermined value or smaller.

In another embodiment of the present disclosure, the spring 94 may not be provided.

In another embodiment of the present disclosure, the magnet holder 90 may not include the slit 95.

In another embodiment of the present disclosure, the washer 922 is not limited to metal, and may be made of, for example, fluororesin. Further, the washer 922 may not be provided.

In another embodiment of the present disclosure, the magnet holder 90 may not include the tapered part 96.

In another embodiment of the present disclosure, the manual shaft 200 may not include the tapered part 203.

In another embodiment of the present disclosure, the rotation restrictor (the rotation restricting pin 97 and the rotation restricting hole 85) may not be provided.

In another embodiment of the present disclosure, the output shaft 80 and the manual shaft 200 may be fitted with each other by, for example, spline fitting.

In another embodiment of the present disclosure, the motor 3 is not limited to the three-phase brushless motor including the magnet 42, and may be a motor of another form such as an SR motor.

In another embodiment of the present disclosure, the detent plate may include any number of recesses. That is, the number of ranges of the automatic transmission to which the present disclosure is applicable is not limited to four.

The shift-by-wire system according to the present disclosure can also be used in range switching in a parking mechanism of an electric vehicle (EV) or an HV which switches two positions of "P" and "notP" in addition to a continuously variable transmission (CVT) or an automatic transmission (A/T) of a hybrid vehicle (HV) which switches four positions of "P", "R", "N", and "D" in a manner similar to the above embodiment.

In another embodiment of the present disclosure, the driving target and the attachment target of the rotary actuator may be a device other than a shift range switching device or a parking switching device of the shift-by-wire system of a vehicle.

In this manner, the present disclosure is not limited to the above embodiments, and can be carried out in various forms without departing from the gist thereof.

Hereinbelow, a rotation driving device according to a plurality of embodiments of the present disclosure will be described with reference to FIGS. 11 to 16. Substantially identical elements are designated by the same reference signs throughout the embodiments illustrated in FIGS. 11 to 16, and description thereof is omitted.

Third Embodiment

Figure 11:
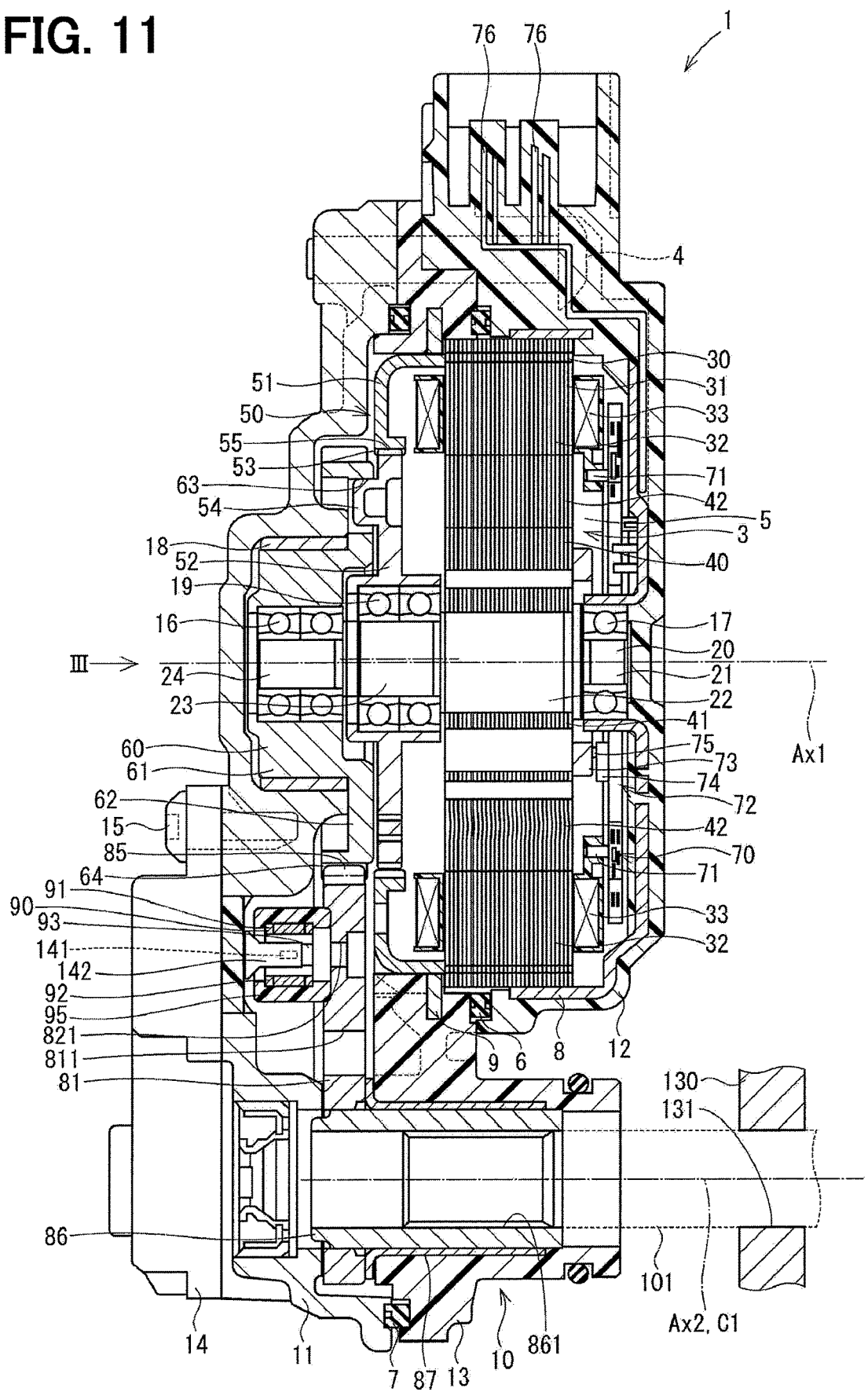
FIG. 11 is a sectional view of a rotation driving device according to a third embodiment.

A rotary actuator 1 as a rotation driving device illustrated in FIG. 11 is, for example, used as a driving unit of a shift-by-wire system which switches a shift of an automatic transmission of a vehicle.

Figure 12:
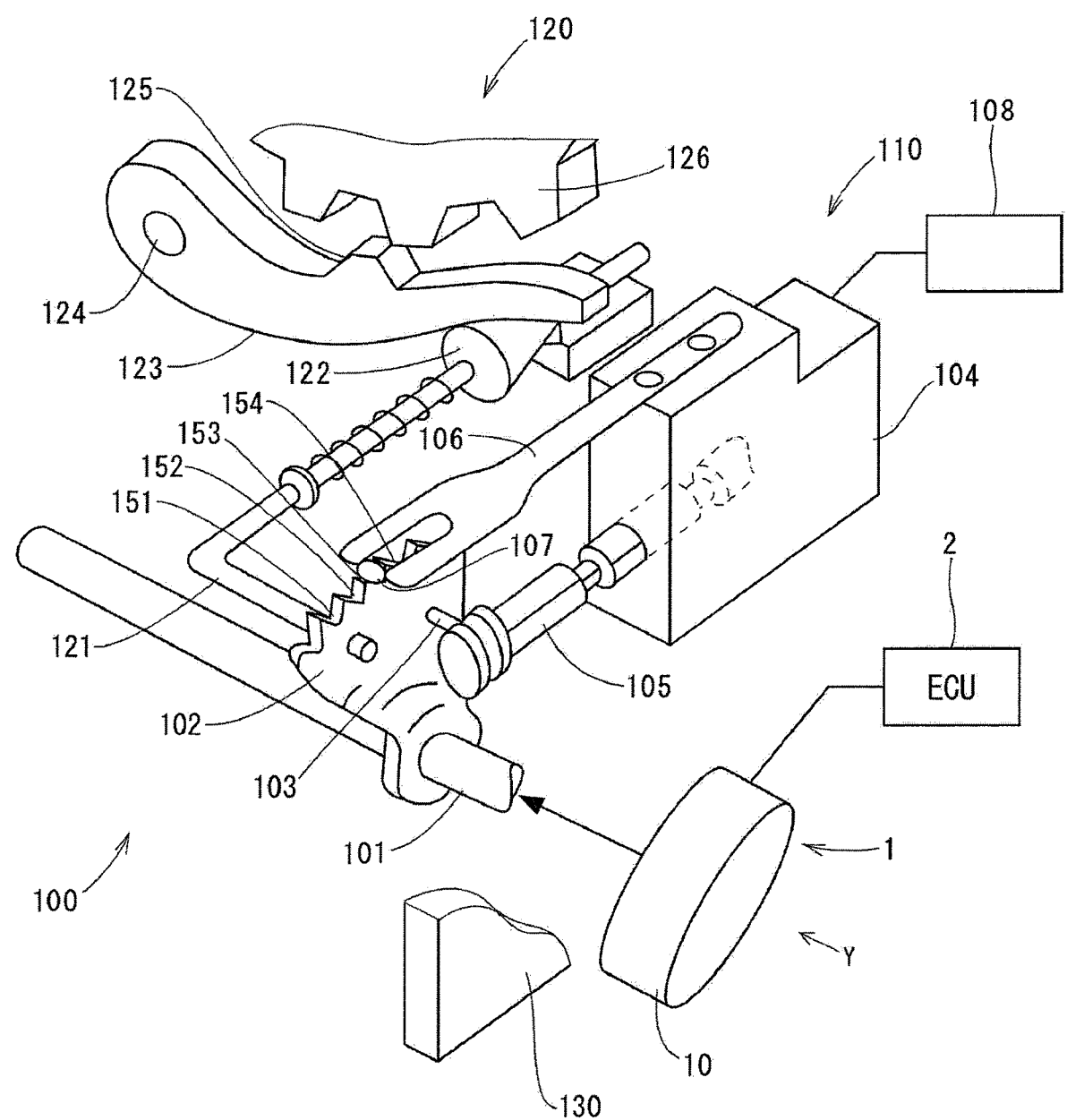
FIG. 12 is a schematic view of a shift-by-wire system in which the rotation driving device according to the third embodiment is used.

First, the shift-by-wire system will be described. As illustrated in FIG. 12, a shift-by-wire system 100 is provided with a rotary actuator 1, an electronic control unit (hereinbelow, referred to as the "ECU") 2, a shift range switching device 110, and a parking switching device 120. The rotary actuator 1 rotates a manual shaft 101 of the shift range switching device 110 as a driving target. Accordingly, the shift range of an automatic transmission 108 is switched. The rotation of the rotary actuator 1 is controlled by the ECU 2. The rotary actuator 1 is, for example, attached to a wall 130 of the shift range switching device 110 as an attachment target. The rotary actuator 1 drives a park rod 121 of the parking switching device 120 by rotating the manual shaft 101 of the shift range switching device 110.

The shift range switching device 110 includes the manual shaft 101, a detent plate 102, a hydraulic valve body 104, and a wall 130. The wall 130 houses the manual shaft 101, the detent plate 102, and the hydraulic valve body 104 therein. One end of the manual shaft 101 projects from the wall 130 through a hole 131 (refer to FIG. 11) which is formed on the wall 130.

The one end of the manual shaft 101 is spline-coupled to an output unit 86 of the rotary actuator 1 (described below). The detent plate 102 is formed in a sector shape extending outward in the radial direction from the manual shaft 101, and rotates integrally with the manual shaft 101. The detent plate 102 is provided with a pin 103 which projects parallel to the manual shaft 101.

The pin 103 is locked to an end of a manual spool valve 105 which is disposed on the hydraulic valve body 104. Thus, the manual spool valve 105 reciprocates in an axial direction by the detent plate 102 which rotates integrally with the manual shaft 101. The manual spool valve 105 reciprocates in the axial direction to switch a hydraulic supply passage to a hydraulic clutch in the automatic transmission 108. As a result, an engagement state of the hydraulic clutch is switched, which changes the shift range of the automatic transmission 108.

The detent plate 102 includes a recess 151, a recess 152, a recess 153, and a recess 154 on an end in the radial direction. The recesses 151 to 154, for example, correspond to a P range, an R range, an N range, and a D range, each of which is the shift range of the automatic transmission 108, respectively. A stopper 107 which is supported on a tip of a leaf spring 106 is fitted into any of the recesses 151 to 154 of the detent plate 102. Accordingly, a position of the manual spool valve 105 in an axial direction is determined.

When torque is applied to the detent plate 102 from the rotary actuator 1 through the manual shaft 101, the stopper 107 moves to another adjacent recess (any of the recesses 151 to 154). Accordingly, the position of the manual spool valve 105 in the axial direction is changed.

For example, when the manual shaft 101 is rotated in a clockwise direction in a view from arrow Y of FIG. 12, the pin 103 pushes the manual spool valve 105 into the hydraulic valve body 104 through the detent plate 102, which switches an oil passage inside the hydraulic valve body 104 to D, N, R, and P in this order. Accordingly, the shift range of the automatic transmission 108 is switched to D, N, R, and P in this order.

On the other hand, when the manual shaft 101 is rotated in a counterclockwise direction, the pin 103 pulls the manual spool valve 105 out of the hydraulic valve body 104, which switches the oil passage inside the hydraulic valve body 104 to P, R, N, and D in this order. Accordingly, the shift range of the automatic transmission 108 is switched to P, R, N, and D in this order.

In this manner, a rotation angle, that is, a predetermined position in a rotation direction of the manual shaft 101 which is driven to rotate by the rotary actuator 1 corresponds to each shift range of the automatic transmission 108.

The parking switching device 120 includes the park rod 121, a park pole 123, and a parking gear 126. The park rod 121 is formed in a substantially L shape. The detent plate 102 is connected to one end of the park rod 121. A conical part 122 is disposed on the other end of the park rod 121. The park rod 121 converts a rotary motion of the detent plate 102 into a linear motion, which reciprocates the conical part 122 in the axial direction. The park pole 123 abuts on the side face of the conical part 122. Thus, when the park rod 121 reciprocates, the park pole 123 rotates about a shaft 124.

The park pole 123 is provided with a projection 125 in the rotation direction thereof. When the projection 125 meshes with teeth of the parking gear 126, the rotation of the parking gear 126 is restricted. Accordingly, a driving wheel is locked through a drive shaft or a differential gear (not illustrated). On the other hand, when the projection 125 of the park pole 123 is detached from the teeth of the parking gear 126, the parking gear 126 becomes rotatable, and the lock of the driving wheel is released.

Next, the rotary actuator 1 will be described.

As illustrated in FIG. 11, the rotary actuator 1 is provided with a housing 10, an input shaft 20, a motor 3 as a rotary electric machine, a reduction gear 50 as a gear mechanism, an output shaft 60, an output gear 81, the output unit 86, a yoke 90, a magnet 93 as a first magnetic flux generator, a magnet 94 as a second magnetic flux generator, a Hall IC 141 as a magnetic flux density detector, first holes 811, 812, 813, and second holes 821, 822, 823.

The housing 10 includes a front housing 11, a rear housing 12, a middle housing 13, and a sensor housing 14. The rear housing 12, the middle housing 13, and the sensor housing 14 are, for example, made of resin. The front housing 11 is, for example, made of metal such as aluminum.

The rear housing is formed in a bottomed tubular shape. The middle housing 13 is formed in an annular shape and abuts on an opening of the rear housing 12. The front housing 11 abuts on the middle housing 13 on the side opposite to the rear housing 12. The sensor housing 14 abuts on the front housing 11 on the side opposite to the middle housing 13. In the present embodiment, the rotary actuator 1 is attached to the wall 130 in such a manner that a face of the rear housing 12 on the side opposite to the front housing 11 faces the wall 130 of the shift range switching device 110.

The rear housing 12 and the front housing 11 are fixed with a bolt 4 with the middle housing 13 interposed therebetween. Accordingly, a space 5 is formed inside the rear housing 12, the middle housing 13, and the front housing 11.

Gaskets 6, 7 each of which is made of rubber and has an annular shape are inserted into a part where the rear housing 12 and the middle housing 13 abut on each other and a part where the middle housing 13 and the front housing 11 abut on each other, respectively. Thus, the inside and the outside of the space 5 are air-tightly and liquid-tightly maintained.

The sensor housing 14 is fixed to the front housing 11 with a bolt 15.

The input shaft 20 is, for example, made of metal. The input shaft 20 includes one end part 21, a large-diameter part 22, an eccentric part 23, and the other end part 24. The one end part 21, the outer-diameter part 22, the eccentric part 23, and the other end part 24 are integrally formed and arranged side by side in the direction of an axis Ax1 in this order.

The one end part 21 is formed in a columnar shape. The large-diameter part 22 is formed in a columnar shape having a larger outer diameter than that of the one end part 21 and coaxial (the axis Ax1) with the one end part 21. The eccentric part 23 is formed in a columnar shape having a smaller outer diameter than that of the large-diameter part 22 and eccentric with respect to the axis Ax1 which is a rotation center of the input shaft 20. That is, the eccentric part 23 is eccentric with respect to the one end part 21 and the large-diameter part 22. The other end part 24 is formed in a columnar shape having a smaller outer diameter than that of the eccentric part 23 and coaxial (the axis Ax1) with the one end part 21 and the large-diameter part 22.

The other end part 24 of the input shaft 20 is rotatably supported by a front bearing 16, and the one end part 21 of the input shaft 20 is rotatably supported by a rear bearing 17. In the present embodiment, each of the front bearing 16 and the rear bearing 17 is, for example, a ball bearing.

The front bearing 16 is disposed inside the output shaft 60 (described below). The output shaft 60 is rotatably supported by a metal bearing 18 which is disposed inside the front housing 11. The metal bearing 18 is made of metal and has a tubular shape. That is, the other end part 24 of the input shaft 20 is rotatably supported through the metal bearing 18, the output shaft 60, and the front bearing 16 which are disposed in the front housing 11. On the other hand, the one end part 21 of the input shaft 20 is rotatably supported through the rear bearing 17 which is disposed on the center of the bottom of the rear housing 12. In this manner, the input shaft 20 is rotatably supported by the housing 10.

The motor 3 as the rotary electric machine is a three-phase brushless motor which generates a driving force without using a permanent magnet. The motor 3 is disposed on the rear housing 12 side in the space 5. That is, the motor 3 is housed in the housing 10. The motor 3 includes a stator 30, a coil 33, and a rotor 40.

The stator 30 is formed in a substantially annular shape. The stator 30 is unrotatably fixed to the rear housing 12 by being press-fitted into a plate 8 which is made of metal and insert-molded to the rear housing 12.

The stator 30 is, for example, formed by laminating a plurality of thin plates made of a magnetic material such as iron in a plate-thickness direction. The stator 30 includes a stator core 31 and a plurality of stator teeth 32. The stator core 31 is formed in an annular shape. The stator teeth 32 project inward in the radial direction from the stator core 31. The stator teeth 32 are formed at regular intervals in the circumferential direction of the stator core 31. In the present embodiment, for example, twelve stator teeth 32 are formed.

The coil 33 is wound around each of the stator teeth 32. The coil 33 is electrically connected to a bus bar 70. The bus bar 70 is disposed on the bottom of the rear housing 12 as illustrated in FIG. 11. Power supplied to the coil 33 flows through the bus bar 70. The bus bar 70 includes a terminal 71 which is connected to the coil 33, the coil 33 being disposed on the stator 30, inside the coil 33 in the radial direction. The coil 33 is electrically connected to the terminal 71. Power is supplied to the terminal 71 in accordance with a drive signal output from the ECU 2.

The rotor 40 is disposed inside the stator 30 in the radial direction. The rotor 40 is, for example, formed by laminating a plurality of thin plates made of a magnetic material such as iron in a plate-thickness direction. The rotor 40 includes a rotor core 41 and a salient pole 42. The rotor core 41 is formed in an annular shape, and press-fitted and fixed to the large-diameter part 22 of the input shaft 20. The salient pole 42 projects from the rotor core 41 toward the stator 30 which is located on the outer side in the radial direction. A plurality of salient poles 42 are formed at regular intervals in the circumferential direction of the rotor core 41. In the present embodiment, for example, eight salient poles 42 are formed. The rotor 40 is rotatable relative to the housing 10 and the stator 30 by the rotor core 41 press-fitted and fixed to the input shaft 20.

When power is supplied to the coil 33, a magnetic force is produced in the stator teeth 32 around which the coils 33 are wound. Accordingly, the corresponding salient pole 42 of the rotor 40 is attracted to the corresponding one of the stator teeth 32. The coils 33 constitute three phases, for example, a U phase, a V phase, and a W phase. When the ECU 2 switches energization to the U phase, the V phase, and the W phase in this order, the rotor 40 rotates, for example, to one side in the circumferential direction. On the other hand, when the ECU 2 switches the energization to the W phase, the V phase, and the U phase in this order, the rotor 40 rotates to the other side in the circumferential direction. In this manner, it is possible to rotate the rotor 40 in any direction by controlling the magnetic force produced in the stator teeth 32 by switching the energization of each of the coils 33.

In the present embodiment, a rotary encoder 72 is disposed between the bottom of the rear housing 12 and the rotor core 41. The rotary encoder 72 includes a magnet 73, a substrate 74, and a Hall IC 75.

The magnet 73 is a multipolar magnet which is formed in an annular shape and polarized in such a manner that the N-pole and the S-pole are alternately arranged in the circumferential direction. The magnet 73 is coaxial with the rotor core 41 and disposed on an end of the rotor core 41 on the rear housing 12 side. The substrate 74 is fixed to an inner wall of the bottom of the rear housing 12. The Hall IC 75 is mounted on the substrate 74 so as to face the magnet 73.

The Hall IC 75 includes a Hall element and a signal conversion circuit. The Hall element is a magnetoelectric conversion element which uses a Hall effect and outputs an electric signal proportional to the density of magnetic flux generated by the magnet 73. The signal conversion circuit converts an output signal of the Hall element to a digital signal. The Hall IC 75 outputs a pulse signal synchronous with the rotation of the rotor core 41 to the ECU 2 through a signal pin 76. The ECU 2 is capable of detecting the rotation angle and the rotation direction of the rotor core 41 on the basis of the pulse signal from the Hall IC 75.

The reduction gear 50 includes a ring gear 51 and a sun gear 52.

The ring gear 51 is, for example, made of metal such as iron and formed in an annular shape. The ring gear 51 is unrotatably fixed to the housing 10 by being press-fitted into a plate 9 which is insert-molded to the middle housing 13 and has an annular shape. The ring gear 51 is fixed to the housing 10 coaxially (the axis Ax1) with the input shaft 20. The ring gear 51 includes internal teeth 53 which are formed on the inner edge thereof.

The sun gear 52 is, for example, made of metal such as iron and formed in a substantially discoid shape. The sun gear 52 includes a projection 54 having a columnar shape. The projection 54 projects in a plate-thickness direction from a position away from the center of one face of the sun gear 52 outward in the radial direction by a predetermined distance. A plurality of projections 54 are formed at regular intervals in the circumferential direction of the sun gear 52. In the present embodiment, for example, nine projections 54 are formed (refer to FIG. 13). The sun gear 52 includes external teeth 55 which are formed on the outer edge of the sun gear 52 so as to mesh with the internal teeth 53 of the ring gear 51. The sun gear 52 is relatively rotatably and eccentrically disposed with respect to the input shaft 20 through a middle bearing 19 which is disposed on the outer periphery of the eccentric part 23 of the input shaft 20. Accordingly, when the input shaft 20 rotates, the sun gear 52 revolves while rotating on its own axis inside the ring gear 51 with the external teeth 55 meshing with the internal teeth 53 of the ring gear 51. The middle bearing 19 is, for example, a ball bearing like the front bearing 16 and the rear bearing 17.

The output shaft 60 is, for example, made of metal such as iron. The output shaft 60 includes an output tubular part 61 having a substantially cylindrical shape and a discoid part 62 having a substantially discoid shape. The output tubular part 61 is rotatably supported by the housing 10 through the metal bearing 18 which is disposed inside the front housing 11. The output tubular part 61 is coaxial with the large-diameter part 22 of the input shaft 20. The front bearing 16 is disposed inside the output tubular part 61. Accordingly, the output tubular part 61 rotatably supports the other end part 24 of the input shaft 20 through the metal bearing 18 and the front bearing 16.

The discoid part 62 is formed in a substantially discoid shape extending outward in the radial direction from an end of the output tubular part 61 on the sun gear 52 side in the space 5. A hole 63 is formed on the discoid part 62. The projection 54 of the sun gear 52 is insertable into the hole 63. The hole 63 penetrates the discoid part 62 in the plate-thickness direction. In the present embodiment, nine holes 63 are formed in the circumferential direction of the discoid part 62 corresponding to the projections 54 (refer to FIG. 13).

Figure 13:
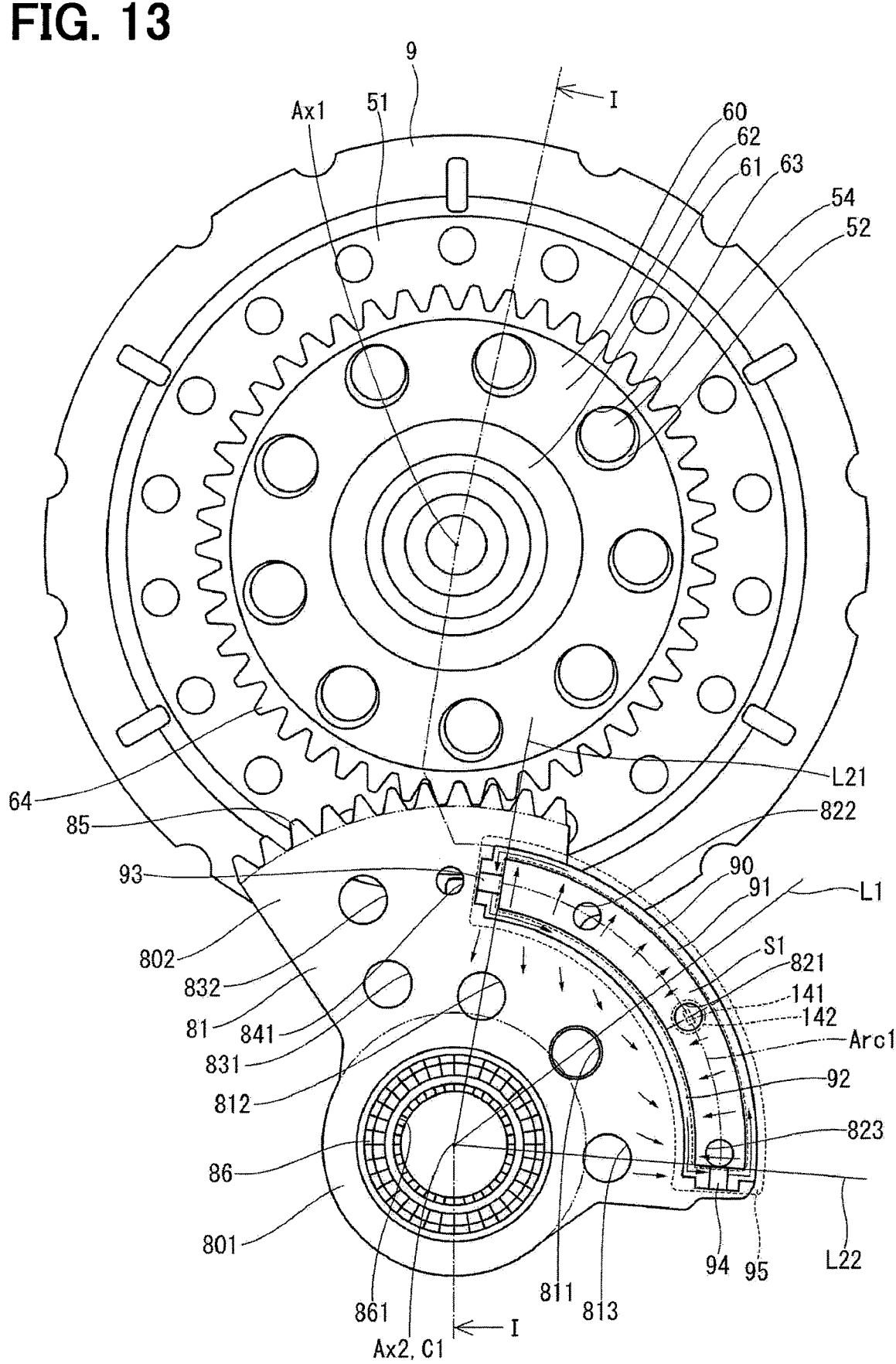
FIG. 13 is a diagram illustrating a part of the rotation driving device according to the third embodiment viewed from the direction of arrow XIII of FIG. 11.

External teeth 64 are formed on the outer edge of the discoid part 62 throughout the entire area in the circumferential direction (refer to FIG. 13).

With the above configuration, when the sun gear 52 revolves while rotating on its own axis inside the ring gear 51, inner walls of the holes 63 of the discoid part 62 of the output shaft 60 are pushed in the circumferential direction of the discoid part 62 by outer walls of the projections 54. Accordingly, a rotation component of the sun gear 52 is transmitted to the output shaft 60.

A speed of the rotation of the sun gear 52 is lower than a rotation speed of the input shaft 20. Thus, a rotation output of the motor 3 is decelerated and output from the output shaft 60. In this manner, the ring gear 51 and the sun gear 52 function as the "reduction gear".

The output gear 81 is, for example, made of a magnetic material having a relatively high strength such as iron. The output gear 81 is formed in a plate-like shape. As illustrated in FIG. 13, the output gear 81 includes an annular part 801, a sector part 802, and external teeth 85.

The annular part 801 is formed in an annular shape. The sector part 802 extends in a sector shape extending outward in the radial direction from the outer edge of the annular part 801. In FIG. 13, a boundary between the annular part 801 and the sector part 802 is indicated by a chain double-dashed line.

The external teeth 85 are formed in a part in the circumferential direction of the outer edge of the sector part 802. The output gear 81 is disposed between the middle housing 13 and the sensor housing 14 in such a manner that the external teeth 85 mesh with the external teeth 64 of the output shaft 60. Accordingly, when the motor 3 is driven to rotate to rotate the output shaft 60, the output gear 81 rotates about the axis of the annular part 801. That is, the output gear 81 rotates by torque output from the motor 3. The axis of the annular part 801 corresponds to a rotation center C1 of the output gear 81.

The output unit 86 is, for example, made of metal having a relatively high strength such as iron and formed in a substantially cylindrical shape. An outer wall of one end of the output unit 86 is fitted with an inner wall of the annular part 801 of the output gear 81. The output unit 86 is disposed on the rotation center C1 of the output gear 81 unrotatably relative to the output gear 81. That is, the output unit 86 is disposed integrally with the output gear 81 in such a manner that the axis Ax2 is aligned with the rotation center C1 of the output gear 81. Thus, when the output gear 81 rotates, the output unit 86 rotates together with the output gear 81 about the rotation center C1.

An end of the output unit 86 on the side opposite to the output gear 81 is located inside a metal bearing 87 which is disposed on the middle housing 13 and has a tubular shape.

Accordingly, the output unit 86 and the output gear 81 are rotatably supported by the middle housing 13 through the metal bearing 87.

A spline groove 861 as a connector is formed on an inner wall of the end of the output unit 86 on the side opposite to the output gear 81.

As illustrated in FIG. 11, the output unit 86 and the manual shaft 101 are spline-coupled to each other by fitting one end of the manual shaft 101 of the shift-by-wire system 100 with the spline groove 861 of the output unit 86. Accordingly, the output unit 86 outputs the torque of the motor 3 to the manual shaft 101 when the rotation of the input shaft 20 is transmitted to the output unit 86 through the reduction gear 50 and the output gear 81.

As illustrated in FIG. 12, the yoke 90 includes a first yoke 91 and a second yoke 92. Each of the first yoke 91 and the second yoke 92 is, for example, formed in an arc shape by laminating thin plates each of which is made of a magnetic material such as iron and has an arc shape. The first yoke 91 and the second yoke 92 are disposed on the sensor housing 14 side with respect to the output gear 81. The first yoke 91 is disposed along the outer edge of the sector part 802 of the output gear 81 at a position where the external teeth 85 are not formed. The second yoke 92 is disposed on the rotation center C1 side of the output gear 81 with respect to the first yoke 91 at a position away from the first yoke 91 by a predetermined distance.

Each of the first yoke 91 and the second yoke 92 is disposed along an arc Arc1 centered at the rotation center C1 of the output gear 81. Accordingly, an arc-shaped space S1 which is a space having an arc shape along the arc Arc1 centered at the rotation center C1 is formed between the first yoke 91 and the second yoke 92.

The magnet 93 as the first magnetic flux generator is inserted between one end of the first yoke 91 and one end of the second yoke 92. The magnet 93 abuts on the one end of the first yoke 91 at the S-pole side and abuts on the one end of the second yoke 92 at the N-pole side.

The magnet 94 as the second magnetic flux generator is inserted between the other end of the first yoke 91 and the other end of the second yoke 92. The magnet 94 abuts on the other end of the first yoke 91 at the N-pole side and abuts on the other end of the second yoke 92 at the S-pole side.

Accordingly, magnetic flux generated from the N-poles of the magnets 93, 94 flows through the first yoke 91 and the second yoke 92. Further, the magnetic flux flowing through the first yoke 91 and the second yoke 92 flies in the arc-shaped space S1 between the first yoke 91 and the second yoke 92 as leakage flux. The magnetic flux generated from the N-poles of the magnets 93, 94 also flows through the output gear 81 which is made of a magnetic material.

In the present embodiment, the first yoke 91, the second yoke 92, and the magnets 93, 94 are covered with a mold part 95 which is made of resin. That is, the first yoke 91, the second yoke 92, and the magnets 93, 94 are molded with resin.

The Hall IC 141 as the magnetic flux density detector is insert-molded to a support member 142 which projects from the sensor housing 14 toward the output gear 81. That is, the Hall IC 141 is disposed on the front housing 11 side. The support member 142 supports the Hall IC 141. As illustrated in FIGS. 11 and 12, the support member 142 and the Hall IC 141 are located in the arc-shaped space S1. That is, the Hall IC 141 is disposed on the sensor housing 14 movably relative to the yoke 90 in the arc-shaped space S1.

The Hall IC 141 includes a Hall element and a signal conversion circuit like the Hall IC 75. The Hall element outputs a signal corresponding to the density of leakage flux flying in the arc-shaped space S1. That is, the Hall element outputs a signal corresponding to the density of magnetic flux passing through the Hall element.

The output gear 81 and the output unit 86 are rotatable within a range of the length in the circumferential direction of the external teeth 85. That is, the rotatable range of the output gear 81 and the output unit 86 corresponds to the range of the length in the circumferential direction of the external teeth 85. The Hall IC 141 and the support member 142 are movable relative to the yoke 90 from the vicinity of an end on the magnet 93 side of the arc-shaped space S1 to the vicinity of an end on the magnet 94 side.

The Hall IC 141 outputs a signal corresponding to the rotation position of the yoke 90 to the ECU 2. The ECU 2 is capable of detecting the rotation position of the output gear 81 and the output unit 86 on the basis of the signal from the Hall IC 141. Accordingly, the ECU 2 is capable of detecting the rotation position of the manual shaft 101 and the shift range of the automatic transmission 108.

As illustrated in FIG. 12, the first hole 811 is formed between the rotation center C1 and the yoke 90 and penetrates the sector part 802 of the output gear 81 in the plate-thickness direction. The first hole 811 is formed in a circular shape. The first hole 811 is formed in such a manner that the center of the first hole 811 is located on a virtual straight line L1 which connects the rotation center C1 to the center of the yoke 90. The first hole 811 is formed along the outer edge of the annular part 801.

In the present embodiment, the first virtual straight line L1 passes through the center of the arc-shaped space S1.

The first hole 812 is formed between the rotation center C1 and the yoke 90 and penetrates the sector part 802 of the output gear 81 in the plate-thickness direction. The first hole 812 is formed in a circular shape in a manner similar to the first hole 811. The first hole 812 is formed in such a manner that the center of the first hole 812 is located on a second virtual straight line L21 which connects the rotation center C1 to one end of the yoke 90, that is, the vicinity of the magnet 93. The first hole 812 is formed along the outer edge of the annular part 801.

The first hole 813 is formed between the rotation center C1 and the yoke 90 and penetrates the sector part 802 of the output gear 81 in the plate-thickness direction. The first hole 813 is formed in a circular shape in a manner similar to the first hole 812. The first hole 813 is formed in such a manner that the center of the first hole 813 is located on a second virtual straight line L22 which connects the rotation center C1 to the other end of the yoke 90, that is, the vicinity of the magnet 94. The first hole 813 is formed along the outer edge of the annular part 801.

In the present embodiment, the first holes 811, 812, 813 are formed at regular intervals in the circumferential direction of the output gear 81.

The second hole 821 is formed at a position corresponding to the arc-shaped space S1 and penetrates the sector part 802 of the output gear 81 in the plate-thickness direction. The second hole 821 is formed in a circular shape. The second hole 821 is formed on the magnet 94 side with respect to the first virtual straight line L1.

The second hole 822 is formed at a position corresponding to the arc-shaped space S1 and penetrates the sector part 802 of the output gear 81 in the plate-thickness direction. The second hole 822 is formed in a circular shape in a manner similar to the second hole 821. The second hole 822 is formed at an intermediate position between the first virtual straight line L1 and the second virtual straight line L21.

The second hole 823 is formed at a position corresponding to the arc-shaped space S1 and penetrates the sector part 802 of the output gear 81 in the plate-thickness direction. The second hole 823 is formed in a circular shape in a manner similar to the second hole 822. The second hole 823 is formed near the second virtual straight line L22.

In addition to the first holes 811, 812, 813 and the second holes 821, 822, 823, holes 831, 832, 841 are formed on the output gear 81.

The holes 831, 832, 841 penetrate the sector part 802 of the output gear 81 in the plate-thickness direction. The holes 831, 832 are formed in a circular shape in a manner similar to the first hole 811. The holes 831, 832 are formed between the annular part 801 and the external teeth 85. The hole 841 is formed in a circular shape in a manner similar to the second hole 821. The hole 841 is formed near the magnet 93 between the annular part 801 and the external teeth 85.

FIG. 13 illustrates magnetic flux which is generated from the N-poles of the magnets 93, 94 and flows through the yoke 90 and the output gear 81 and leakage flux flowing in the arc-shaped space S1. The direction of an arrow indicating the magnetic flux corresponds to the direction of the magnetic flux, and the length of the line of the arrow corresponds to the degree of the magnetic flux density.

As illustrated in FIG. 13, the density of leakage flux flying in the arc-shaped space S1 is higher at a position closer to the magnet 93 or the magnet 94 and lower at a position closer to the first virtual straight line L1. The direction of leakage flux flying in the arc-shaped space S1 is inverted between the magnet 93 side and the magnet 94 side across the first virtual straight line L1. Thus, the magnetic flux density becomes zero at the position corresponding to the first virtual straight line L1 in the arc-shaped space S1. Since the first holes 811, 812, 813 are formed on the output gear 81, the path of magnetic flux flowing through the output gear 81 is narrowed.

As described above, the rotary actuator 1 of the present embodiment is provided with the housing 10, the motor 3, the output gear 81, the output unit 86, the yoke 90, the magnet 93, the magnet 94, the Hall IC 141, and the first holes 811, 812, 813.

The motor 3 is disposed inside the housing 10.

The output gear 81 is made of a magnetic material and rotates by the torque output from the motor 3.

The output unit 86 is disposed integrally with the output gear 81 in such a manner that the axis Ax2 is aligned with the rotation center C1 of the output gear 81, and rotates together with the output gear 81.

The yoke 90 is disposed on the output gear 81. The yoke 90 includes the first yoke 91 and the second yoke 92 which forms the arc-shaped space S1 along the arc Arc1 centered at the rotation center C1 of the output gear 81 with the first yoke 91.

The magnet 93 is disposed between the one end of the first yoke 91 and the one end of the second yoke 92.

The magnet 94 is disposed between the other end of the first yoke 91 and the other end of the second yoke 92.

The Hall IC 141 is disposed on the housing 10 movably relative to the yoke 90 in the arc-shaped space S1 and outputs a signal corresponding to the density of magnetic flux passing through the Hall IC.

The first holes 811, 812, 813 are formed between the rotation center C1 of the output gear 81 and the yoke 90 and penetrate the output gear 81 in the plate-thickness direction.

In the present embodiment, magnetic flux generated from the magnet 93 and the magnet 94 flows through the first yoke 91 and the second yoke 92 and flies in the arc-shaped space S1 between the first yoke 91 and the second yoke 92 as leakage flux. The Hall IC 141 outputs a signal corresponding to the density of leakage flux flying in the arc-shaped space S1. Accordingly, it is possible to detect the position of the yoke 90 relative to the Hall IC 141 and detect the rotation position of the output unit 86.

The magnetic flux generated from the magnet 93 and the magnet 94 also flows through the output gear 81 which is made of a magnetic material. In the present embodiment, the first holes 811, 812, 813 are formed between the rotation center C1 of the output gear 81 and the yoke 90, that is, at a specific part of the output gear 81. Thus, it is possible to narrow the path of magnetic flux flowing through the output gear 81. Accordingly, it is possible to reduce magnetic flux flowing through the output gear 81. Thus, it is possible to increase the density of leakage flux flying in the arc-shaped space S1. Thus, it is possible to increase the accuracy of detecting the rotation position of the output unit 86.

When the yoke 90, the magnet 93, and the magnet 94 are, for example, disposed on a rotary member which is separated from the output unit 86 and rotates by the rotation of the output unit 86, the accuracy of detecting the rotation position of the output unit 86 may be reduced by a play between the output unit 86 and the rotary member. In the present embodiment, the yoke 90, the magnet 93, and the magnet 94 are disposed on the output gear 81 which is integral with the output unit 86 which outputs torque of the rotary actuator 1. Thus, it is possible to detect the rotation position of the output unit 86 with high accuracy.

The output gear 81 on which the yoke 90 is disposed is made of a magnetic material having a relatively high strength. Thus, the output gear 81 is preferably used in the middle of a power transmission path to the output unit 86 which outputs torque of the rotary actuator 1.

In the present embodiment, the first hole 811 is formed on the first virtual straight line L1 which connects the rotation center C1 to the center of the yoke 90. The magnetic flux density becomes zero at the position corresponding to the first virtual straight line L1 in the arc-shaped space S1. Thus, it is possible to narrow the path of magnetic flux flowing to the part corresponding to the position where the magnetic flux density becomes zero in the arc-shaped space S1 in the output gear 81 by the first hole 811 on the first virtual straight line L1. Accordingly, it is possible to increase the magnetic flux density near the position where the magnetic flux density becomes zero in the arc-shaped space S1. If the first hole 811 is not formed on the output gear 81, the density of leakage flux is reduced near the position where the magnetic flux density becomes zero in the arc-shaped space S1. On the other hand, in the present embodiment, it is possible to increase the magnetic flux density near the position where the magnetic flux density becomes zero in the arc-shaped space S1. Thus, in particular, it is possible to increase the accuracy of detecting the rotation position of the output unit 86 on the center of the rotatable range of the output gear 81 and the output unit 86. Thus, it is possible to increase the accuracy of detecting the rotation position of the output unit 86 over the entire area of the rotatable range of the output gear 81 and the output unit 86.

In the present embodiment, the first hole 812 is formed on the second virtual straight line L21 which connects the rotation center C1 to the one end of the yoke 90. Further, the first hole 813 is formed on the second virtual straight line L22 which connects the rotation center C1 to the other end of the yoke 90. Thus, it is possible to increase the magnetic flux density at the end on the magnet 93 side and the end on the magnet 94 side in the arc-shaped space S1. Accordingly, in particular, it is possible to increase the accuracy of detecting the rotation position of the output unit 86 at both ends of the rotatable range of the output gear 81 and the output unit 86.

In the present embodiment, the plurality of first holes (811, 812, 813) are formed in the circumferential direction of the output gear 81. Thus, it is possible to uniformly increase the magnetic flux density in the length direction of the arc-shaped space S1. In the present embodiment, the three first holes (811, 812, 813) are formed at regular intervals in the circumferential direction of the output gear 81.

The present embodiment further includes the second holes 821, 822, 823 which are formed at the positions corresponding to the arc-shaped space S1 and penetrate the output gear 81 in the plate-thickness direction. Thus, it is possible to reduce magnetic flux flowing through the part corresponding to the arc-shaped space S1 in the output gear 81. Accordingly, it is possible to further increase the density of leakage flux flying in the arc-shaped space S1. Thus, it is possible to further increase the accuracy of detecting the rotation position of the output unit 86.

The present embodiment provides the rotary actuator 1 which is attached to the wall 130 as the attachment target and capable of rotating the manual shaft 101 of the shift range switching device 110 as the driving target and provided with the front housing 11, the rear housing 12, the motor 3, the reduction gear 50, the output unit 86, and the Hall IC 141.

The rear housing 12 forms the space 5 with the front housing 11. The rear housing 12 is disposed in such a manner that the face on the side opposite to the front housing 11 is capable of facing the wall 130.

The motor 3 is disposed on the rear housing 12 side in the space 5.

The reduction gear 50 as the gear mechanism is disposed on the front housing 11 side with respect to the motor 3 in the space 5 and capable of transmitting torque of the motor 3.

The output unit 86 is disposed outside the motor 3 in the radial direction. The output unit 86 includes the spline groove 861 which is connectable to the manual shaft 101 of the shift range switching device 110 on the wall 130 side. The output unit 86 outputs torque transmitted by the reduction gear 50 to the manual shaft 101 of the shift range switching device 110.

The Hall IC 141 is disposed on the front housing 11 side rotatably relative to the output unit 86, and outputs a signal corresponding to the density of magnetic flux passing through the Hall IC 141.

In the present embodiment, the reduction gear 50 is disposed on the front housing 11 side with respect to the motor 3. Thus, the rear housing 12 which is disposed on the side opposite to the reduction gear 50 with respect to the motor 3 can be formed in a flat shape. Accordingly, it is possible to reduce a dead space which may be formed between the rear housing 12 and the wall 130 when the rotary actuator 1 is attached to the wall 130. Thus, it is possible to improve the mountability of the rotary actuator 1.

In the present embodiment, the Hall IC 141 is disposed on the front housing 11 side. That is, the Hall IC 141 can be disposed on the side opposite to the motor 3 with respect to the reduction gear 50. Thus, it is possible to increase the distance between the Hall IC 141 and the motor 3. Accordingly, it is possible to prevent leakage flux from the motor 3 from affecting the Hall IC 141. Thus, it is possible to improve the accuracy of detecting the rotation position of the output unit 86 by the Hall IC 141.

In the present embodiment, since the Hall IC 141 is disposed on the front housing 11 side, it is possible to more reliably prevent an increase of the dead space which may be formed between the rear housing 12 and the wall 130 compared to the case where the Hall IC 141 is disposed on the rear housing 12 side.

The present embodiment includes the output gear 81 which is disposed integrally rotatably with the output unit 86 on the side opposite to the rear housing 12 in the motor 3, and rotates by torque transmitted by the reduction gear 50. The Hall IC 141 is disposed on the side opposite to the motor 3 with respect to the output gear 81. Thus, it is possible to increase the distance between the Hall IC 141 and the motor 3 and block leakage flux from the motor 3 by the output gear 81. Accordingly, it is possible to more reliably prevent the leakage flux from the motor 3 from affecting the Hall IC 141.

The shift-by-wire system 100 of the present embodiment includes the rotary actuator 1 and the shift range switching device 110. The shift range switching device 110 is connected to the output unit 86 of the rotary actuator 1 and capable of switching the shift range of the automatic transmission 108 by torque output from the output unit 86.

In the rotary actuator 1 of the present embodiment, the accuracy of detecting the rotation position of the output unit 86 is high. Thus, it is possible to detect the rotation position of the manual shaft 101 to which the output unit 86 is connected and the shift range of the automatic transmission 108 with high accuracy.

Fourth Embodiment

Figure 14:
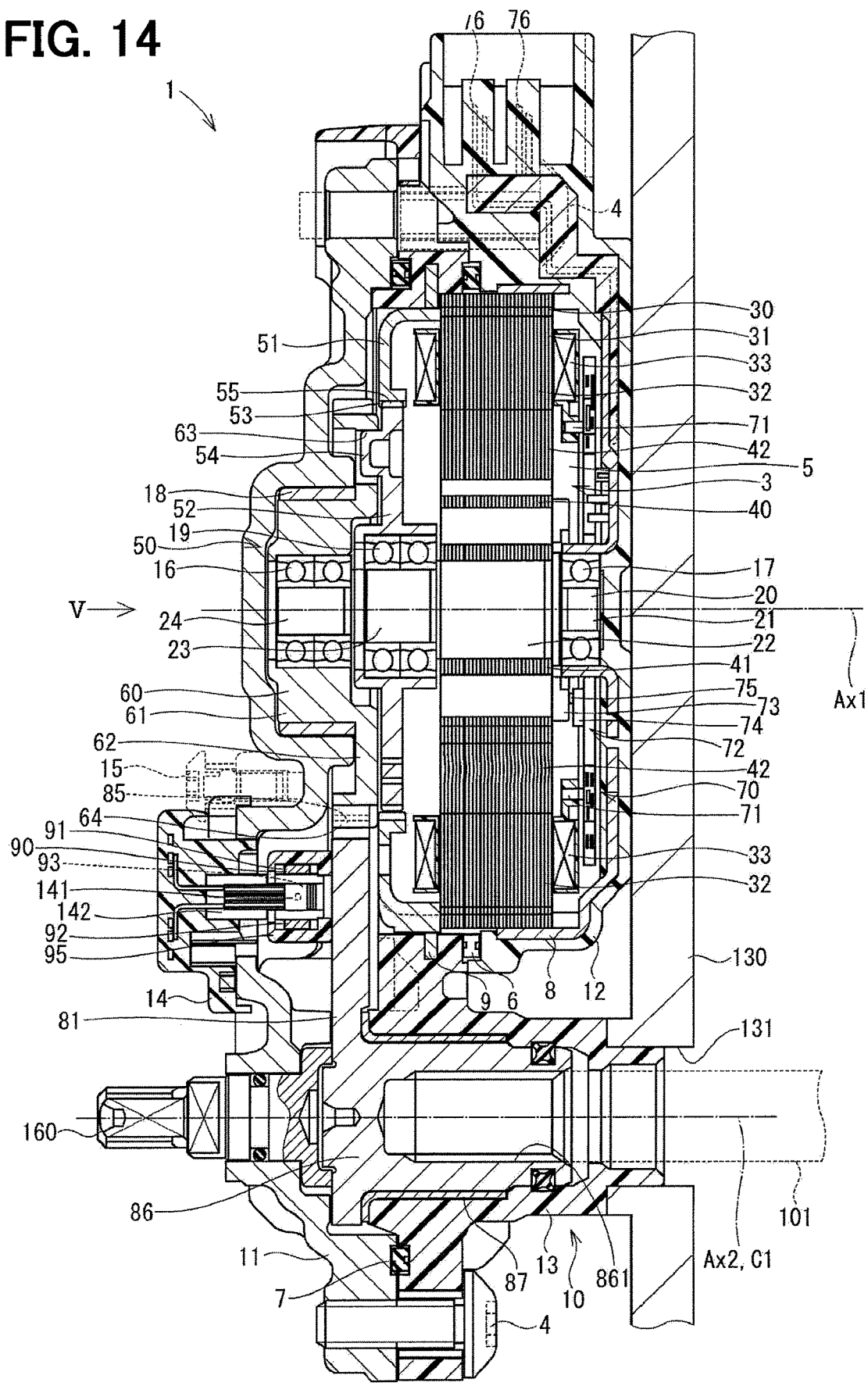
FIG. 14 is a sectional view of a rotation driving device according to a fourth embodiment.
Figure 15:
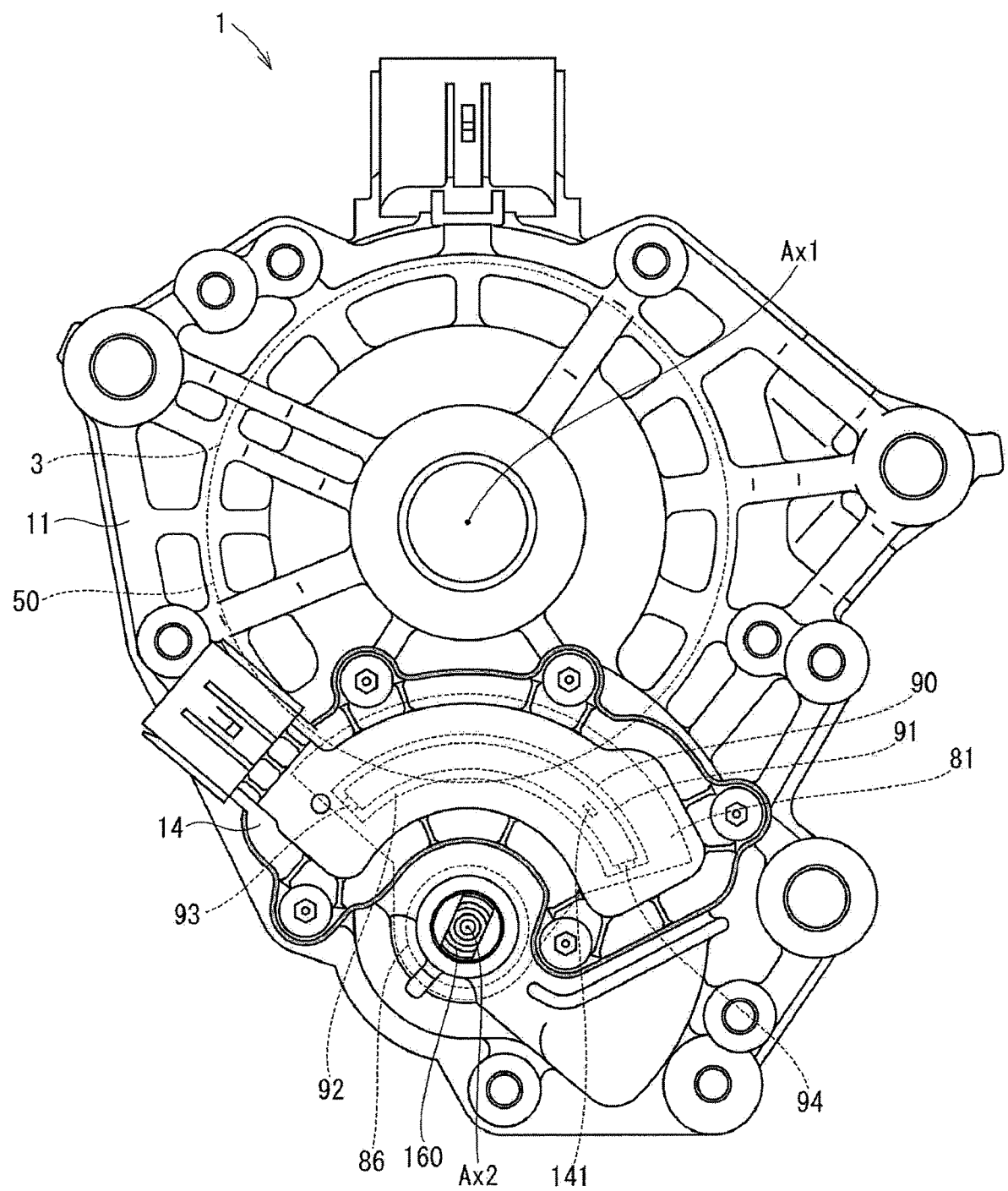
FIG. 15 is a diagram viewed from the direction of arrow XV of FIG. 14.

FIGS. 14 and 15 illustrate a rotary actuator according to a fourth embodiment of the present disclosure.

The fourth embodiment further includes a forcible driving shaft 160.

The forcible driving shaft 160 is, for example, made of metal and formed in an elongated shape. The forcible driving shaft 160 is disposed on the side opposite to a spline groove 861 on an axis (Ax2) of an output unit 86. In the present embodiment, the forcible driving shaft 160 is coaxial with the output unit 86.

The forcible driving shaft 160 is capable of forcibly rotating the output unit 86 when torque is input. In the present embodiment, when the output unit 86 is forcibly driven to rotate by the forcible driving shaft 160, a manual shaft 101 rotates in a direction in which the mesh between a projection 125 of a park pole 123 and a parking gear 126 is released, that is, a stopper 107 moves from a recess 151 (P range) toward a recess 154 (D range).

For example, even when the rotary actuator 1 becomes inoperable in the P range of the shift range, the P range (lock of a driving wheel) can be released by manually rotating the forcible driving shaft 160.

In the present embodiment, the rotary actuator 1 is attached to a wall 130 of a shift range switching device 110 in such a manner that a face of a rear housing 12 on the side opposite to a front housing 11 abuts on the wall 130 (refer to FIG. 14).

As illustrated in FIG. 15, in the present embodiment, a yoke 90 is disposed between a reduction gear 50 and the forcible driving shaft 160.

In the present embodiment, an output gear 81 and the output unit 86 are integrally formed of the same member. In the present embodiment, the first hole 811 and the second hole 821 described in the third embodiment are not formed.

The fourth embodiment has a configuration similar to the configuration of the third embodiment except the point described above. Thus, the fourth embodiment can achieve effects similar to the effects of the third embodiment for the configuration similar to the configuration of the third embodiment.

As described above, the present embodiment further includes the forcible driving shaft 160. The forcible driving shaft 160 is disposed on the side opposite to the spline groove 861 on the axis of the output unit 86 and capable of forcibly rotating the output unit 86 when torque is input. Thus, even when the rotary actuator 1 becomes inoperable in the P range of the shift range, the P range (lock of a driving wheel) can be released by manually rotating the forcible driving shaft 160.

Further, the present embodiment includes the output gear 81 and the yoke 90. A Hall IC 141 is movable relative to the yoke 90 in an arc-shaped space S1 formed between a first yoke 91 and a second yoke 92. The yoke 90 is disposed between the reduction gear 50 and the forcible driving shaft 160. In this manner, in the present embodiment, the yoke 90 is disposed in a space which is formed between the reduction gear 50 and the forcible driving shaft 160 by disposing the forcible driving shaft 160. Accordingly, the space can be effectively utilized.

Fifth Embodiment

Figure 16:
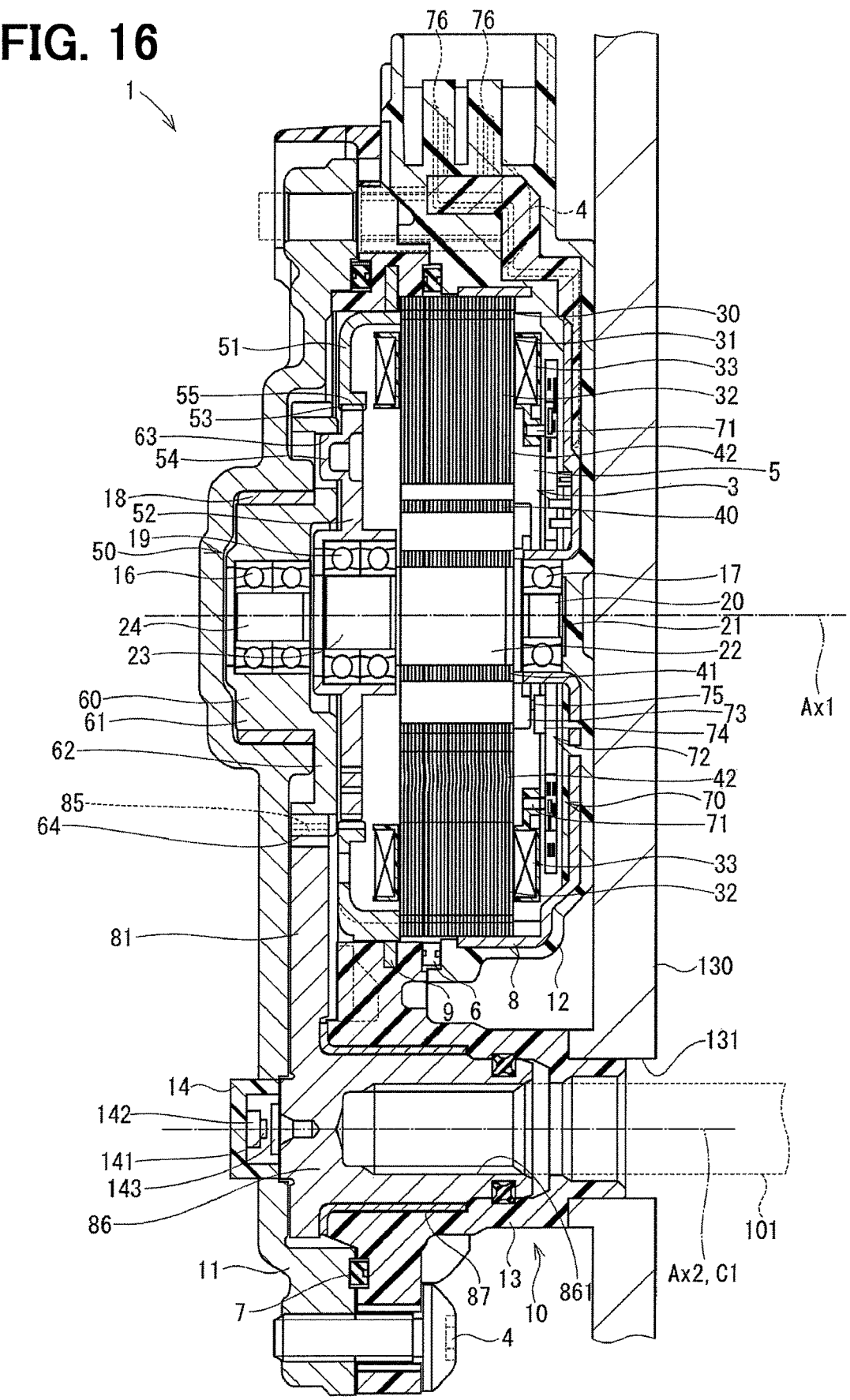
FIG. 16 is a sectional view of a rotation driving device according to a fifth embodiment.

FIG. 16 illustrates a rotary actuator according to a fifth embodiment of the present disclosure. The fifth embodiment differs from the fourth embodiment in the disposition of a Hall IC 141.

In the fifth embodiment, the yoke 90 and the forcible driving shaft 160 described in the fourth embodiment are not provided. Further, the Hall IC 141 is disposed on an axis (Ax2) of an output unit 86. More specifically, the Hall IC 141 is supported by a support member 142 which is disposed on the axis (Ax2) of the output unit 86 inside a sensor housing 14, A magnet 143 is disposed on an end of the output unit 86 on the side opposite to a spline groove 861. Thus, the magnet 143 is rotatable together with the output unit 86. The magnet 143 faces the Hall IC 141 on the axis (Ax2) of the output unit 86.

The Hall IC 141 outputs a signal corresponding to the density of magnetic flux generated by the magnet 143. Accordingly, it is possible to detect a rotation position of the magnet 143 relative to the Hall IC 141 and detect a rotation position of the output unit 86.

Also in the fifth embodiment, the Hall IC 141 is disposed on the side opposite to a motor 3 with respect to an output gear 81. Thus, it is possible to increase the distance between the Hall IC 141 and the motor 3 and block leakage flux from the motor 3 by the output gear 81. In the fifth embodiment, since the Hall IC 141 is disposed on the axis (Ax2) of the output unit 86, the distance between the Hall IC 141 and the motor 3 is larger than that in the fourth embodiment.

The fifth embodiment has a configuration similar to the configuration of the fourth embodiment except the point described above. Thus, the fifth embodiment can achieve effects similar to the effects of the fourth embodiment for the configuration similar to the configuration of the fourth embodiment.

As described above, in the present embodiment, the Hall IC 141 is disposed on the axis (Ax2) of the output unit 86. Thus, it is possible to increase the distance between the Hall IC 141 and the motor 3 and more reliably prevent leakage flux from the motor 3 from affecting the Hall IC 141. Further, the yoke 90 can be omitted, which contributes to reduction of the number of components, downsizing of a body structure, and simplification of a magnetic circuit. In the configuration of the fourth embodiment in which the Hall IC 141 is disposed at the position away from the axis of the output unit 86, when the output shaft 60 and the output gear 81 are tilted, the distance between the yoke 90 and the Hall IC 141 changes, which may reduce the detection accuracy of the Hall IC 141. On the other hand, in the present embodiment, the Hall IC 141 is disposed on the axis (Ax2) of the output unit 86. Thus, even when the output unit 86 is tilted, a change in the distance between the magnet 143 and the Hall IC 141 is small. Accordingly, it is possible to prevent a reduction in the detection accuracy of the Hall IC 141.

Other Embodiments

The above embodiments describe an example in which the three first holes (811, 812, 813) are formed at regular intervals in the circumferential direction of the output gear. On the other hand, in another embodiment of the present disclosure, the first holes may not be formed at regular intervals in the circumferential direction of the output gear. Further, one, two, or four or more first holes may be formed on the output gear. The center of the first hole may not be located on the first virtual straight line L1 or the second virtual straight line L21, L22.

In another embodiment of the present disclosure, the first hole and the second hole are not limited to a circular shape, and may be formed in any shape such as an elliptical shape, a triangular shape, a rectangular shape, or a polygonal shape.

In another embodiment of the present disclosure, the number of second holes is not limited to three (821, 822, 823), and one, two, or four or more second holes may be formed on the output gear.

In another embodiment of the present disclosure, the second hole may not be formed on the output gear.

In another embodiment of the present disclosure, at least one of the holes 831, 832, 841 may not be formed on the output gear 81.

The above embodiments describe an example in which the reduction gear which decelerates the rotation of the input shaft and transmits the decelerated rotation to the output shaft is provided as the gear mechanism. On the other hand, in another embodiment of the present disclosure, a speed-increasing gear which accelerates the rotation of the input shaft and transmits the accelerated rotation to the output shaft may be provided as the gear mechanism. Alternatively, instead of the reduction gear, a mechanism that transmits the rotation of the input shaft to the output shaft with uniform velocity may be provided. Alternatively, the mechanisms such as the reduction gear and the speed-increasing gear may not be provided, and the input shaft and the output shaft may be integrally coupled or formed relatively unrotatably. That is, the output shaft may be any output shaft capable of outputting torque of the rotary electric machine to the shaft as a driving target by the rotation of the input shaft transmitted thereto.

The above embodiments describe an example in which the rotary actuator is attached to the housing of the shift range switching device. On the other hand, in another embodiment of the present disclosure, the rotary actuator may be attached to a part other than the housing in the shift range switching device or an outer wall of the device.

In another embodiment of the present disclosure, the rotary electric machine is not limited to the three-phase brushless motor and may be a motor of another form.

In another embodiment of the present disclosure, the detent plate may include any number of recesses. That is, the number of ranges of the automatic transmission to which the present disclosure is applicable is not limited to four.

The shift-by-wire system according to the present disclosure can also be used in range switching in a parking mechanism of an electric vehicle (EV) or an HV which switches two positions of "P" and "notP" in addition to a continuously variable transmission (CVT) or an automatic transmission (A/T) of a hybrid vehicle (HV) which switches four positions of "P", "R", "N", and "D" in a manner similar to the above embodiment.

In another embodiment of the present disclosure, the driving target and the attachment target of the rotary actuator may be a device other than a shift range switching device or a parking switching device of the shift-by-wire system of a vehicle.

The present disclosure is not limited to the above-mentioned embodiments, and may have various modifications as described below without departing from the gist of the present disclosure.

While the present disclosure has been described with reference to embodiments thereof, it is to be understood that the disclosure is not limited to the embodiments and constructions. The present disclosure is intended to cover various modification and equivalent arrangements. In addition, while various combinations and configurations are shown in the present disclosure, other combinations and configurations, including more, less or only a single element, are also within the spirit and scope of the present disclosure.

What is claimed is:

1. A rotary actuator capable of rotating a shaft of a driving target, the rotary actuator comprising:
    a housing;
    a motor disposed inside the housing;
    an output shaft that includes a shaft hole with which the shaft is fittable, rotates by torque output from the motor, and outputs torque to the shaft;
    a magnet holder that includes a holder hole with which the shaft is fittable and is rotatable together with the shaft;
    a magnet disposed on the magnet holder; and
    an angle sensor capable of detecting magnetic flux from the magnet and outputting a signal corresponding to a rotation angle of the magnet holder, wherein
    a play amount between the shaft and the shaft hole is set to a first predetermined value or larger,
    a play amount between the shaft and the holder hole is set to a second predetermined value or smaller,
    the output shaft and the magnet holder are separately formed to be relatively rotatable, and
    the first predetermined value is larger than the second predetermined value.

2. The rotary actuator according to claim 1, wherein the first predetermined value is larger than zero, and the second predetermined value is set as zero.

3. The rotary actuator according to claim 1, wherein the shaft is able to pass through the shaft hole, and one end of the holder hole is closed to prohibit the shaft from penetrating.

4. The rotary actuator according to claim 1, wherein the output shaft has a shaft tubular part in which the shaft hole is formed, and the magnet holder has a holder tubular part in which the holder hole is formed.

5. The rotary actuator according to claim 4, wherein the angle sensor is unable to move relative to the housing, and the housing supports the shaft tubular part, and the shaft tubular part supports the holder tubular part.

6. The rotary actuator according to claim 5, wherein a part of the housing supporting the shaft tubular part, and a part of the shaft tubular part supporting the holder tubular part overlap in an axial direction.

7. The rotary actuator according to claim 4, wherein the angle sensor is unable to move relative to the housing, and the housing supports the holder tubular part.

8. The rotary actuator according to claim 4, wherein at least a part of the holder tubular part is located inside the shaft tubular part.

9. The rotary actuator according to claim 4, wherein the holder tubular part has a first holder tubular part in which the holder hole is formed, and a second holder tubular part having the magnet, and the second holder tubular part is located opposite to the driving target through the first holder tubular part.

10. The rotary actuator according to claim 9, wherein an outer diameter of the second holder tubular part is larger than an outer diameter of the first holder tubular part.

11. The rotary actuator according to claim 9, wherein the angle sensor is located inside the second holder tubular part.

12. The rotary actuator according to claim 9, wherein the magnet is one of two magnets, and the angle sensor is located between the two magnets.

13. The rotary actuator according to claim 1, further comprising: a rotation restrictor capable of restricting a relative rotation between the magnet holder and the output shaft.

14. The rotary actuator according to claim 13, wherein the output shaft has a rotation regulating portion able to regulate relative rotation between the output shaft and the shaft, and the rotation restrictor restricts relative rotation between the magnet holder and the output shaft, and the rotation regulating portion regulates relative rotation between the output shaft and the shaft, to enable positioning of the magnet holder, the output shaft, and the shaft.

15. The rotary actuator according to claim 13, wherein the magnet holder includes a tapered part formed in a tapered shape, and the tapered part approaches an axis of the holder hole as going from the driving target toward a side opposite to the driving target in a part of the holder hole adjacent to the driving target.

16. The rotary actuator according to claim 15, wherein $\theta3-\theta4>\theta2$, when
    $\theta2$ denotes a play amount between the shaft and the motor,
    $\theta3$ denotes a correction angle that is a maximum relative rotation angle when the magnet holder and the shaft relatively rotate by an end of the shaft moving in the axial direction while making contact with the tapered part when the shaft is fitted with the holder hole, and
    $\theta4$ denotes a play amount between the magnet holder and the output shaft in the rotation restrictor.

17. The rotary actuator according to claim 1, wherein the output shaft has a shaft tubular part in which the shaft hole is formed, and a gear part formed integrally with the shaft tubular part to extend from an outer peripheral wall of the shaft tubular part outward in a radial direction, and the motor outputs torque into the gear part.

18. The rotary actuator according to claim 17, further comprising: a reduction gear that transmits torque outputted from the motor to the gear part.

19. The rotary actuator according to claim 1, wherein the output shaft is disposed between the magnet holder and the driving target.

20. The rotary actuator according to claim 1, wherein the shaft hole penetrates the output shaft in an axial direction.

21. The rotary actuator according to claim 1, wherein the magnet holder and the angle sensor are disposed on an axis of the shaft.

22. The rotary actuator according to claim 1, wherein the magnet holder is made of a material having an elastic modulus within a predetermined range.

23. The rotary actuator according to claim 1, further comprising a spring that is disposed outside the holder hole in a radial direction and capable of fastening the magnet holder to the shaft.

24. The rotary actuator according to claim 1, wherein the magnet holder includes a slit having a cut-away shape in a part in a circumferential direction of the holder hole.

25. The rotary actuator according to claim 1, wherein the housing includes a thrust load receiver on which a load in the axial direction from the magnet holder acts.

26. The rotary actuator according to claim 1, further comprises a washer disposed between the magnet holder and the thrust load receiver.

27. The rotary actuator according to claim 1, wherein:

the driving target includes a holding mechanism capable of positioning the shaft by holding a rotation position of the shaft at a predetermined position; and $\theta 1 < \theta 2$, when $\theta 1$ denotes a variation in an accuracy of positioning the shaft in the holding mechanism when the motor drives the shaft, and $\theta 2$ denotes a play amount between the shaft and the motor.

* * * * *